US012762792B2

(12) United States Patent
Baek et al.

(10) Patent No.: US 12,762,792 B2
(45) Date of Patent: Oct. 13, 2026

(54) METHOD OF DETERMINING ILLUMINATION PATTERN FOR THREE-DIMENSIONAL SCENE AND METHOD AND APPARATUS FOR MODELING THREE-DIMENSIONAL SCENE

(71) Applicants: SAMSUNG ELECTRONICS CO., LTD., Suwon-si (KR); POSTECH RESEARCH AND BUSINESS DEVELOPMENT FOUNDATION, Pohang-si (KR)

(72) Inventors: Seung-Hwan Baek, Pohang-si (KR); Seokjun Choi, Pohang-si (KR); Seungwoo Yoon, Pohang-si (KR); Seungyong Lee, Pohang-si (KR); Jinwoo Park, Pohang-si (KR); Nahyup Kang, Suwon-si (KR); Jiyeon Kim, Suwon-si (KR)

(73) Assignees: SAMSUNG ELECTRONICS CO., LTD., Suwon-si (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 87 days.

(21) Appl. No.: 18/669,048

(22) Filed: May 20, 2024

(65) Prior Publication Data

US 2024/0394964 A1 Nov. 28, 2024

(30) Foreign Application Priority Data

May 24, 2023 (KR) ........................ 10-2023-0067282
Nov. 2, 2023 (KR) ........................ 10-2023-0150041

(51) Int. Cl.
*G06T 17/00* (2006.01)
*G06V 10/24* (2022.01)
*G06V 10/60* (2022.01)

(52) U.S. Cl.
CPC .............. *G06T 17/00* (2013.01); *G06V 10/24* (2022.01); *G06V 10/60* (2022.01)

(58) Field of Classification Search
CPC ................... G06T 15/506; G06T 17/00; G06T 2207/20081; G06T 2207/20084;
(Continued)

(56) References Cited

U.S. PATENT DOCUMENTS 11,295,514 B2 4/2022 Gu et al.
2010/0289878 A1* 11/2010 Sato ..................... H04N 13/239 348/46
(Continued)

FOREIGN PATENT DOCUMENTS

JP 2010-526295 A 7/2010
JP 6403446 A 10/2018
(Continued)

OTHER PUBLICATIONS

Dejan Azinović, et al., "High Res Facial Appearance Capture from Polarized Smartphone Images", in 2023 IEEE/CVF Conference on Computer Vision and Pattern Recognition (CVPR), 2023, pp. 16836-16846, doi: 10.1109/CVPR52729.2023.01615.
(Continued)

*Primary Examiner* — Hau H Nguyen
(74) *Attorney, Agent, or Firm* — Sughrue Mion, PLLC

(57) ABSTRACT

A method of determining an illumination pattern includes constructing a dataset by estimating a first surface normal vector of a three-dimensional (3D) object from a first image obtained by capturing the 3D object of which surface normal information is known, the dataset including basis images of
(Continued)

the 3D object; generating simulation images in which virtual illumination patterns, obtained based on a combination of the basis images, are applied to the 3D object; estimating a second surface normal vector of the 3D object, by reconstructing a surface normal using a photometric stereo technique based on the virtual illumination patterns and simulation images corresponding to the virtual illumination patterns; and training a neural network to determine an illumination pattern based on a difference between the first surface normal vector and the second surface normal vector.

20 Claims, 14 Drawing Sheets

(58) Field of Classification Search
CPC ......... G06T 7/586; G06T 15/00; G06T 15/50; G06T 2207/10152; G06T 2207/10012; G06T 9/002; G06T 5/60; G06F 18/214; H04N 13/204; G06V 10/60; G06V 10/24; G06V 20/64
See application file for complete search history.

(56) References Cited

U.S. PATENT DOCUMENTS

| | | | | |
|---|---|---|---|---|
| 2022/0051471 | A1* | 2/2022 | Logothetis | G06T 15/205 |
| 2022/0335682 | A1* | 10/2022 | Dave | G06N 3/09 |

FOREIGN PATENT DOCUMENTS

| | | | |
|---|---|---|---|
| KR | 10-1216953 | B1 | 12/2012 |
| KR | 10-2112795 | B1 | 5/2020 |

OTHER PUBLICATIONS

Valentin Deschaintre, et al., "Deep polarization imaging for 3D shape and SVBRDF acquisition", in 2021 IEEE/CVF Conference on Computer Vision and Pattern Recognition (CVPR), 2021, pp. 15562-15571, doi: 10.1109/CVPR46437.2021.01531.

Ziang Cheng, et al., "WildLight: In the wild Inverse Rendering with a Flashlight", in 2023 IEEE/CVF Conference on Computer Vision and Pattern Recognition (CVPR), 2023, pp. 4305-4314, doi: 10.1109/CVPR52729.2023.00419.

* cited by examiner

350

METHOD OF DETERMINING ILLUMINATION PATTERN FOR THREE-DIMENSIONAL SCENE AND METHOD AND APPARATUS FOR MODELING THREE-DIMENSIONAL SCENE

CROSS-REFERENCE TO RELATED APPLICATIONS

This application claims priority from Korean Patent Application No. 10-2023-0067282, filed on May 24, 2023, and Korean Patent Application No. 10-2023-0150041, filed on Nov. 2, 2023, in the Korean Intellectual Property Office, the disclosures of which are herein incorporated by reference in their entireties.

BACKGROUND

1. Field

The following description relates to a method of determining an illumination pattern for a three-dimensional (3D) scene and a method and an apparatus for modeling a 3D scene.

2. Description of Related Art

Reconstructing a surface normal of an actual object may be an important task in application programs in various fields, for example, three-dimensional (3D) reconstruction, relighting, or inverse rendering. The surface normal may be reconstructed, for example, through a photometric stereo technique for reconstructing a surface normal by using an intensity change of a scene point under various illumination conditions. However, a general photometric stereo technique may not determine an optimal illumination pattern and may not process an artifact that occurs due to a specular reflection. Thus, it is difficult to provide a high-quality surface normal.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an embodiment, there is provided a method of determining an illumination pattern, the method including: constructing a dataset by estimating a first surface normal vector of a three-dimensional (3D) object from a first image obtained by capturing the 3D object of which surface normal information is known, the dataset including basis images of the 3D object; generating simulation images in which virtual illumination patterns, obtained based on a combination of the basis images, are applied to the 3D object; estimating a second surface normal vector of the 3D object, by reconstructing a surface normal using a photometric stereo technique based on the virtual illumination patterns and simulation images corresponding to the virtual illumination patterns; and training a neural network to determine an illumination pattern based on a difference between the first surface normal vector and the second surface normal vector.

The constructing the dataset may include obtaining the first image by capturing the 3D object under a basis illumination; and estimating the first surface normal vector from the first image by using a differentiable rendering technique.

The obtaining the first image may include performing preprocessing of removing a specular reflection component from the first image.

The performing the preprocessing may include: predicting a location of lattice points, displayed on a display device, by using a mirror; and removing the specular reflection component from the first image by adjusting a location of the display device to be in the location of the lattice points.

The first image may be obtained by capturing the 3D object by using a polarization camera, and the obtaining the first image by removing the specular reflection component may include: optically distinguishing the specular reflection component and a diffuse reflection component from the first image; and removing the specular reflection component from the first image and obtaining, as the first image, an image of the diffuse reflection component.

The estimating the first surface normal vector may include: aligning the first image and a second image, which is rendered by using the differentiable rendering technique, to be the same by optimizing a movement parameter and a rotation parameter of the 3D object in a virtual environment; and estimating the first surface normal vector based on the aligned first image and second image.

The generating the simulation images may include corresponding to the basis images, synthesizing the simulation images obtained by simulating, in a differentiable method, images captured by using the virtual illumination patterns.

The synthesizing the simulation images may include synthesizing the simulation images by applying, for each of the virtual illumination patterns, a weighted sum in which a red, green, and blue (RGB) color intensity corresponding to at least a part of each of the basis images is multiplied by a corresponding virtual illumination pattern.

The predicting the second surface normal vector may include reconstructing a surface normal of the 3D object by using a display and a camera.

The predicting the second surface normal vector may include reconstructing at least one of a surface normal or a diffuse albedo from the simulation images corresponding to the virtual illumination patterns.

The reconstructing the at least one of the surface normal or the diffuse albedo may include setting the diffuse albedo to a maximum intensity between the simulation images; estimating the surface normal by using a pseudo-inverse method based on the diffuse albedo set to the maximum intensity; estimating the diffuse albedo by using the pseudo-inverse method for each RGB channel of the simulation images; and reconstructing the surface normal and the diffuse albedo by repeating estimation on the surface normal and the diffuse albedo.

The predicting the second surface normal vector may include predicting the second surface normal vector by replacing a linear system based on the photometric stereo technique with virtual simulation patterns and the simulation images corresponding to the virtual illumination patterns.

According to an aspect of an embodiment, there is provided a method of modeling a three-dimensional (3D) scene, the method including: obtaining illumination patterns, corresponding to a 3D target object, by using a trained neural network; capturing a target scene including the 3D target object by using the illumination patterns; and modeling a 3D scene corresponding to the target scene by restoring, based on the illumination patterns, a surface normal of the 3D target object using a photometric stereo technique.

The modeling the 3D scene may include: obtaining a diffuse reflection image corresponding to one of the illumination patterns by separating a diffuse reflection component and a specular reflection component in each frame of the target scene; and estimating a surface normal vector of the 3D target object by applying the photometric stereo technique to the diffuse reflection image.

The neural network may be trained by a dataset constructed by estimating a first surface normal vector of a 3D object from a first image, the first image being obtained by capturing the 3D object of which surface normal information is known.

According to an aspect of an embodiment, there is provided a non-transitory computer-readable storage medium storing instructions that, when executed by a processor, cause the processor to perform: constructing a dataset by estimating a first surface normal vector of a three-dimensional (3D) object from a first image obtained by capturing the 3D object of which surface normal information is known, the dataset including basis images of the 3D object; generating simulation images in which virtual illumination patterns, obtained based on a combination of the basis images, are applied to the 3D object; estimating a second surface normal vector of the 3D object, by reconstructing a surface normal using a photometric stereo technique based on the virtual illumination patterns and simulation images corresponding to the virtual illumination patterns; and training a neural network to determine an illumination pattern based on a difference between the first surface normal vector and the second surface normal vector.

According to an aspect of an embodiment, there is provided an apparatus for modeling a three-dimensional (3D) scene, the apparatus including: a communication interface configured to receive illumination patterns corresponding to a 3D target object; a camera configured to capture a target scene including the 3D target object by using the illumination patterns; and a processor configured to model a 3D scene corresponding to the target scene by restoring, based om the illumination patterns, a surface normal of the 3D target object using a photometric stereo technique.

The processor may be further configured to: obtain a diffuse reflection image corresponding to one of the illumination patterns by separating a diffuse reflection component and a specular reflection component in each frame of the target scene; and estimate a surface normal vector of the 3D target object by applying the photometric stereo technique to the diffuse reflection image.

The apparatus may further include a display configured to display at least one of the illumination patterns or the modeled 3D scene.

The apparatus may further include at least one of a lighting stage, a handheld flash camera, an imaging system comprising a display camera system, a wearable device comprising a smart glass, a head-mounted device (HMD) comprising at least one of an augmented reality (AR) device, a virtual reality (VR) device, or a mixed reality (MR) device; or a user terminal comprising at least one of a television, a smartphone, a personal computer (PC), a tablet, or a laptop.

BRIEF DESCRIPTION OF THE DRAWINGS

The above and/or other aspects will be more apparent by describing certain example embodiments, taken in conjunction with the accompanying drawings, in which.

Figure 1:
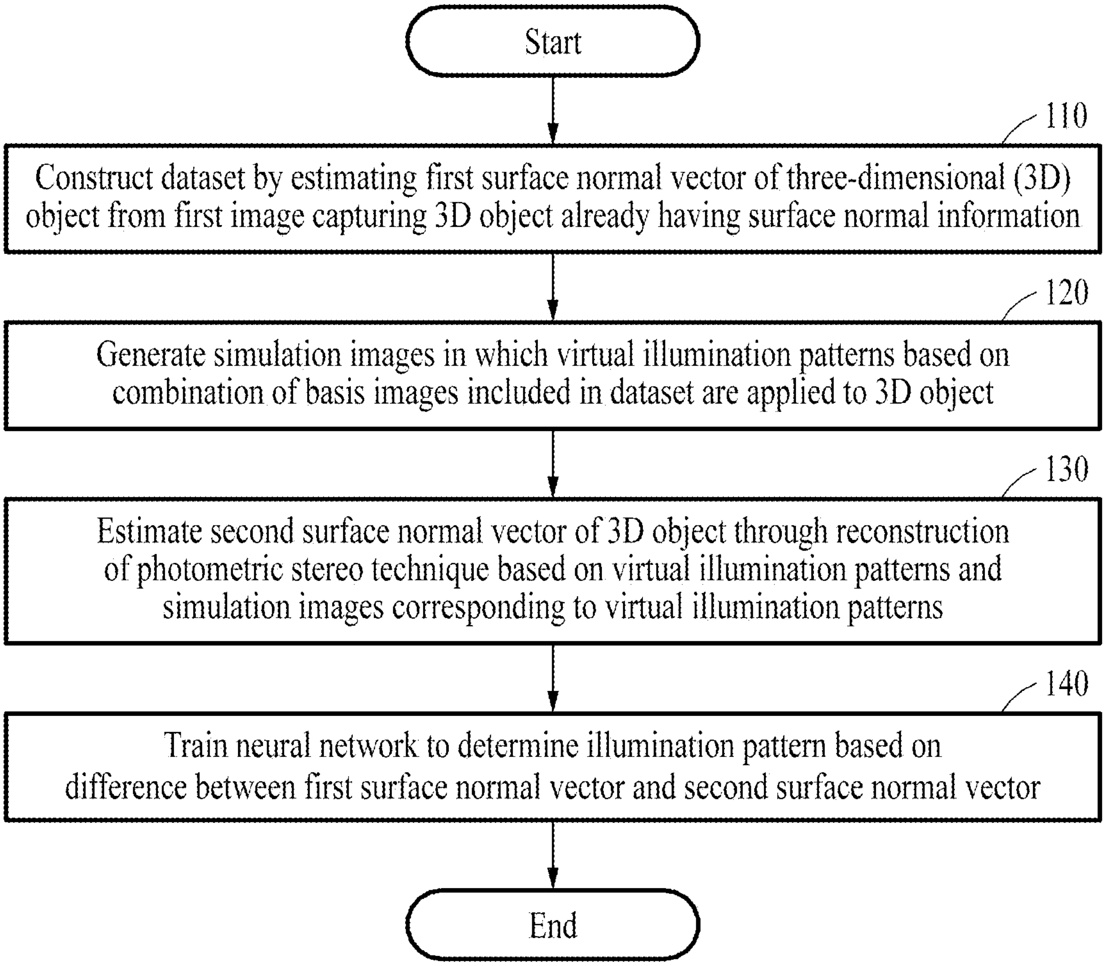
FIG. 1 is a flowchart illustrating a method of determining an illumination pattern, according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

Unless otherwise defined, all terms, including technical and scientific terms, used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and a repeated description related thereto will be omitted. Features described in one example embodiment may be present in other example embodiments.

FIG. 1 is a flowchart illustrating a method of determining an illumination pattern, according to an example embodiment. In example embodiments described hereinafter, operations may be performed sequentially but may not necessarily be performed sequentially. For example, the order of operations may be changed, and at least two operations may be performed in parallel. Referring to FIG. 1, a pattern determination device according to an example embodiment may output an illumination pattern through operations 110 to 150.

In operation 110, the pattern determination device may construct a dataset by estimating a first surface normal vector of a three-dimensional (3D) object from a first image obtained by capturing the 3D object of which surface normal information is already known. The 3D object of which surface normal information is already known may be a 3D-printed object to be described later, but examples are not limited thereto. The first surface normal vector relates to an actually captured 3D object, and thus may also be referred to as a "ground truth normal vector".

Prior to the construction of the dataset in operation 110, the pattern determination device may perform preprocessing for removing a specular reflection component from the first image. During the preprocessing, the pattern determination device may perform image preprocessing on the first image together with calibration. When the preprocessing is performed, the pattern determination device may construct the dataset from the preprocessed first image. The pattern determination device may estimate a location of lattice points displayed on a display by using a mirror, for example, by using a mirror-based calibration technique, and may adjust a location of the display to be in the location of the lattice points. The pattern determination device may obtain the first image through the preprocessing of removing a specular reflection component from an image obtained by adjusting the location of the display. The method of performing the preprocessing by the pattern determination device will be described in more detail below with reference to FIGS. 3A to 3D.

The pattern determination device may obtain the first image obtained by capturing the 3D object by using a basis illumination. The pattern determination device may estimate the first surface normal vector from the first image through a differentiable rendering technique. Here, the basis illumination may have, for example, a one-light-a-time (OLAT) pattern in which one light source is turned on at a time at a maximum intensity. The OLAT pattern may be generally used when the intensity of each light source, like a light stage, is sufficient to provide light energy detectable by a camera sensor without large noise. When the OLAT pattern is extended to an adjacent light source group, light energy may increase and measurement noise may decrease. In this case, a complementary pattern in which half the illumination is turned on and a remaining half is turned off with respect to each 3D axis may also be used as the basis illumination.

The pattern determination device may determine a movement parameter of the 3D object and a rotation parameter of the 3D object in a virtual environment and may align a second image, rendered through the differentiable rendering technique, with the first image such that the second image becomes the same as the first image. The pattern determination device may estimate the first surface normal vector based on the aligned first and second images. The pattern determination device may generate an actual photometric stereo dataset having a known shape by using the 3D-printed object. The method of constructing a dataset by the pattern determination device will be described in more detail below with reference to FIGS. 4A and 4B.

In operation 120, the pattern determination device may generate simulation images in which virtual illumination patterns, which are based on a combination of basis images (e.g., basis images 430 of FIG. 4A below) included in the dataset, are applied to the 3D object. The virtual illumination patterns may be generated by using the combination of basis images, and thus, the basis images may also be referred to as "basis illumination images". The pattern determination device may, corresponding to the basis images, synthesize the simulation images obtained by simulating, in a differentiable method, images captured by using the virtual illumination patterns. The pattern determination device may simulate various actual illumination conditions through only simple operations by using the basis images and thus may achieve simple and effective optimization of an illumination pattern. The pattern determination device may synthesize the simulation images by a weighted sum applied by multiplying, for each of the virtual illumination patterns, a red, green, and blue (RGB) color intensity corresponding to at least a part of each of the basis images by a corresponding virtual illumination pattern, for example. The method of synthesizing the simulation images will be described in more detail below with reference to FIGS. 5A and 5B.

In operation 130, the pattern determination device may estimate a second surface normal vector of the 3D object through reconstruction of a surface normal according to a photometric stereo technique based on the virtual illumination patterns and simulation images corresponding to the virtual illumination patterns. The pattern determination device may reconstruct a surface normal by using an intensity change of a scene point under various illumination conditions by using the photometric stereo technique. The method of reconstructing the surface normal may be applied to, for example, a light stage using numerous point light sources, a handheld flash camera, and various imaging systems (e.g., an imaging system 310 of FIG. 3A below) including a display camera system. The pattern determination device may estimate the second surface normal vector by replacing a linear system based on the photometric stereo technique with the virtual illumination patterns and the simulation images corresponding to the virtual illumination patterns.

The photometric stereo technique may be computer vision technology for estimating the surface normal of an object by observing the object under various illumination conditions and may be a technique for sequentially applying several illuminations or illumination patterns to a target object and extracting a 3D shape of the object by using at least three images obtained through a camera. In an example embodiment, the illumination pattern(s) may be provided through a display, such as a monitor, and thus may also be referred to as "display pattern(s)".

In the photometric stereo technique, as a number of illuminations increases, the 3D shape of the object may be extracted more reliably. This is because an amount of light reflected on a surface of the object varies depending on a direction of the surface of the object with respect to a light source and an observer. A possible space of the direction of the object surface may be limited by measuring the amount of light reflected on a camera. When a sufficient light source is provided at various angles, the direction of the object surface may be limited to a single direction or may be limited excessively.

In particular, a display photometric stereo technique using a display as an illumination source may provide a versatile accessible system. The display may include numerous trichromatic pixels which may serve as a programmable point light source. In an example embodiment, a differentiable display photometric stereo (DDPS) technique for reconstructing a high-quality surface normal may be used by using the display, such as a standard monitor, and a camera. The DDPS technique may reconstruct a standard normal optimized for a target system by learning an illumination pattern by using a differentiable framework and end-to-end optimization, instead of relying on a handmade illumination pattern. Hereinafter, for ease of description, the DDPS technique is briefly expressed as the photometric stereo technique. Accordingly, the term "photometric stereo technique" may be construed as referring to the DDPS technique even without any separate description.

In an example embodiment, a differentiable pipeline may be used, in which the forming of a basis illumination image and an optimization-based photometric stereo technique are combined. A basis illumination model may be used to form the basis illumination image, and the basis illumination model may operate in a manner such that an image is captured by setting an individual light source to a maximum intensity while at the same time, maintaining another light source turned off. The above-described differentiable pipeline may re-propagate a final reconstruction loss to an illumination pattern and may enable an efficient training of the illumination pattern.

The pattern determination device may optimize an illumination pattern through a reconstruction loss of a surface normal by using the image formation by the photometric stereo technique and the differentiable framework of reconstruction. The photometric stereo technique may optimize an illumination pattern to reconstruct a normal. The photometric stereo technique may use a ubiquitous liquid crystal display (LCD) device for a display illumination and a polarization state thereof. The photometric stereo technique may apply a normal reconstruction loss directly to illumination training by using a 3D-printed object and may reduce a gap between a synthesized domain and an actual domain. The photometric stereo technique will be described in more detail below with reference to FIG. 2.

The pattern determination device may estimate the second surface normal vector by replacing the linear system based on the photometric stereo technique with the virtual illumination patterns and the simulation images corresponding to the virtual illumination patterns. The pattern determination device may reconstruct at least one of a surface normal and a diffuse albedo from the simulation images corresponding to the virtual illumination patterns. The pattern determination device may set the diffuse albedo to a maximum intensity between the simulation images. The pattern determination device may estimate the surface normal by using a pseudo-inverse method based on the diffuse albedo set to the maximum intensity. The pattern determination device may estimate the diffuse albedo by using the pseudo-inverse method for each RGB channel of the simulation images. The pattern determination device may reconstruct the surface normal and the diffuse albedo by repeating estimation on the surface normal and the diffuse albedo.

The reconstruction method of the photometric stereo technique and an example of the linear system based on the photometric stereo technique will be described in more detail below with reference to FIGS. 5A and 5B.

In operation 140, the pattern determination device may train a neural network to determine an illumination pattern based on a difference between the first surface normal vector estimated in operation 110 and the second surface normal vector estimated in operation 130. The neural network may be, for example, a deep feedforward network (DFN), a convolutional neural network (CNN), or a recurrent neural network (RNN), but examples are not limited thereto.

The pattern determination device may modify an initial illumination pattern, for example, in the following two methods, by using the photometric stereo technique. In a first method, the pattern determination device may adjust an area of a bright region to ensure a suitable capturing of an image intensity at various angles. In a second method, the pattern determination device may provide various illumination patterns for each color channel by modifying a color distribution of the initial illumination pattern according to a trichromatic photometric stereo. The photometric stereo technique may use trichromatic illumination in various directions by spatially distributing an RGB intensity in various regions. In this case, an overall shape of an illumination pattern may be determined at an initial stage of a training process, but examples are not limited thereto. The pattern determination device may output the illumination pattern determined by the neural network trained in operation 140. In this case, the output illumination pattern may be an illumination pattern having sufficient illuminations for all pixels to reconstruct a surface normal.

Figure 2:
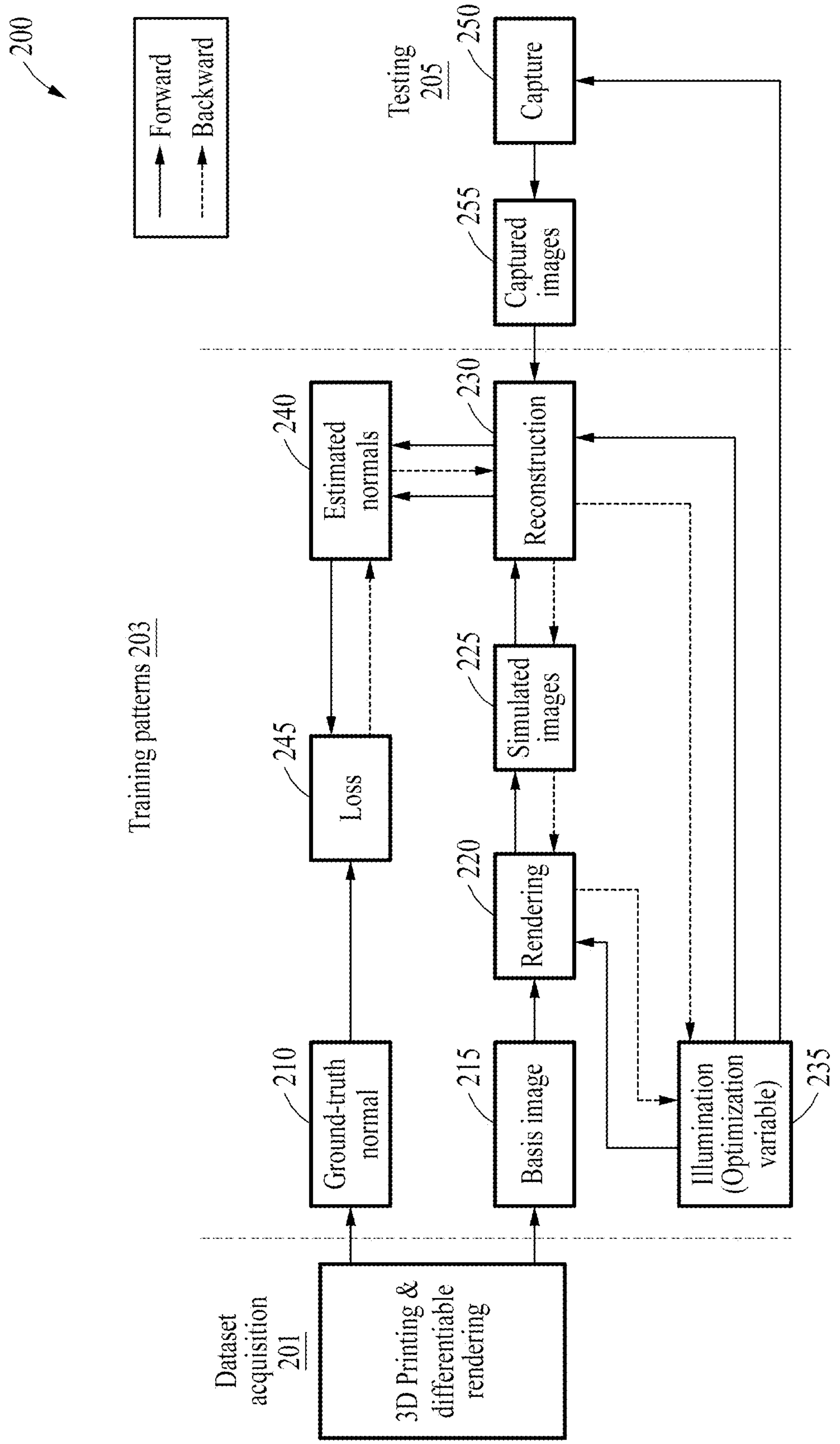
FIG. 2 is a diagram illustrating an overview of a photometric stereo technique, according to an example embodiment.

FIG. 2 is diagram 200 illustrating an overview of a photometric stereo technique, according to an example embodiment. In an example embodiment, a DDPS technique designed to achieve surface normal reconstruction with high fidelity may be used by using a display and a camera.

The DDPS technique may include operation 201 of acquiring a dataset, operation 203 of training patterns, and operation 205 of testing. Operation 201 of acquiring a dataset and operation 203 of training patterns may be included in the method of determining an illumination pattern described above with reference to FIG. 1. Operation 205 of testing may be an inference process for modeling a 3D scene by using a trained illumination pattern described in more detail below with reference to FIG. 6.

In operation 201 of acquiring a dataset, a pattern determination device may capture a 3D-printed object by using a basis illumination and may obtain a first surface normal vector of the object through differentiable rendering based on a captured image.

Prior to operation 201 of acquiring a dataset, the pattern determination device may perform calibration and image preprocessing. In preprocessing, the pattern determination device may estimate a location of lattice points displayed on a display by using a mirror. The pattern determination device may perform mirror-based calibration for adjusting a location of the display such that the location of the display may be in the location of the lattice points. The pattern determination device may remove a specular reflection component by adjusting the location of the display through the calibration and may obtain a first image.

In addition, the pattern determination device may separate the specular reflection component from the captured image by using a polarization feature. The mirror-based calibration and the method of separating the specular reflection component will be described in more detail below with reference to FIGS. 3A to 3D.

In operation 201 of acquiring a dataset, the pattern determination device may perform 3D printing on an object by using various 3D models, may capture basis images of the 3D-printed object, and may obtain an actual surface normal map by using the captured basis images. In this case, the obtained actual surface normal map may correspond to the first surface normal vector.

The pattern determination device may construct a realistic training dataset by using the 3D-printed object to reduce a gap between a synthesized domain and an actual domain, wherein the synthesized domain is generated due to the use of synthesized training data during end-to-end optimization. The pattern determination device may extract an actually measured surface normal map (e.g., a first surface normal vector 210) by matching an actually measured geometry of a 3D model with the captured image. The pattern determination device may effectively reduce a gap between the synthesized and actual domains by combining the formation of basis images 215 with the extraction of the actually measured surface normal map (e.g., the first surface normal vector 210).

In addition, the pattern determination device may optically filter specular reflection by combining linear polarization, released by the display, with the camera since the display, such as a monitor, releases the linear polarization and may extract an image (or referred to as a diffuse reflection image) in which a diffuse reflection component is dominant from the captured basis images 215. The pattern determination device may satisfy the Lambertian assumption about the photometric stereo technique by using the diffuse reflection image and may reconstruct, in operation 230, a surface normal more accurately. According to the Lambertian's cosine law, a radiant intensity when observing a Lambertian surface may be proportional to an angle formed between an observation point and a surface normal direction. This may mean that the radiant intensity is greater when viewing the Lambertian surface from a surface that matches (that is, coplanar with) a normal than when viewing the Lambertian surface at an angle. The Lambertian surface may refer to a surface of which brightness is the same when viewed from any direction. The Lambertian surface may reflect the same amount of light in all directions, and thus, the brightness of light in all directions may be viewed as the same regardless of a location of an observer. In this case, the Lambertian assumption may indicate that the object has characteristics of the Lambertian surface.

In addition, the pattern determination device may estimate a pixel location of the display (e.g., the monitor) for the DDPS system more accurately through a mirror-based calibration technique to be described later.

In operation 203 of training patterns, the pattern determination device may combine the basis images 215 obtained in operation 201 and may simulate a new image by performing rendering in operation 220 on virtual illumination patterns 235. In this case, the simulated image using the virtual illumination patterns 235 may also be referred to as a simulation image 225.

The pattern determination device may replace an image formation formula (e.g., Equation 8 below) approximated to a linear system with the virtual illumination patterns 235 and the simulation image(s) 225 corresponding to the virtual illumination patterns 235 and may calculate a surface normal vector (a second surface normal vector) 240 for the object. This process may be based on the photometric stereo technique. The pattern determination device may calculate a difference value 245 between the first surface normal vector 210 corresponding to a ground truth and the calculated second surface normal vector 240 and may optimize an illumination pattern by backpropagating the difference value 245.

Operation 203 of training patterns may be a process of training illumination patterns, which leads from a training dataset to operation 230 of high-quality normal reconstruction. The pattern determination device may optimize the illumination patterns 235 by using an image formation framework and the photometric stereo technique and may provide operation 230 of high-quality normal reconstruction. In an example embodiment, a serial process of simulating a change of scenes according to the illumination patterns 235 and calculating the surface normal of an object by using a simulation result may be designed to be differentiable.

In operation 205 of testing, the pattern determination device may capture, in operation 250, an actual scene by using the optimized illumination patterns 235 through operation 203 of training patterns. The pattern determination device may restore (perform operation 230 of high-quality normal reconstruction) the surface normal of objects captured in operation 205 of testing through the photometric stereo technique used in operation 203 of training patterns.

In operation 205 of testing, the pattern determination device may use the optimized illumination pattern(s) 235 through operation 203 of training patterns and may perform a test for estimating the surface normal of an object included in an actual scene. In this case, the optimized illumination pattern(s) 235 may be displayed by being converted into an 8-bit RGB pattern, for example. The pattern determination device may capture, in operation 250, polarized images, for example, in various, repetitive K (K being an integer) illumination patterns 235. The pattern determination device may perform separation of a diffuse reflection component and a specular reflection component in each frame and may obtain a diffuse reflection image for an ith (i being an integer between 1 and K) illumination pattern. The pattern determination device may estimate the surface normal by applying the photometric stereo technique to the diffuse reflection image.

Figure 3A:
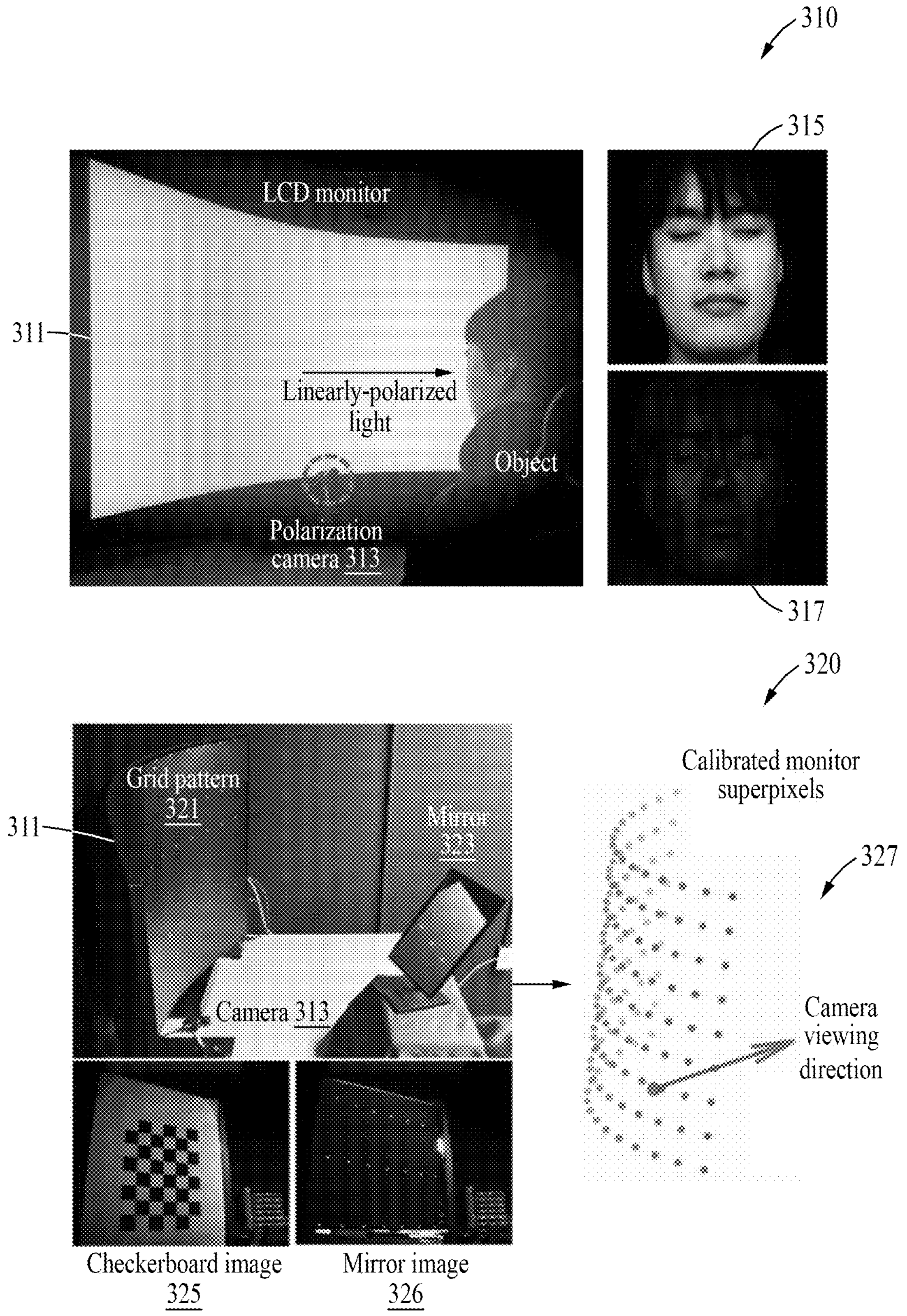
FIGS. 3A to 3D are diagrams each illustrating mirror-based calibration and image preprocessing, according to an example embodiment.
Figure 3B:
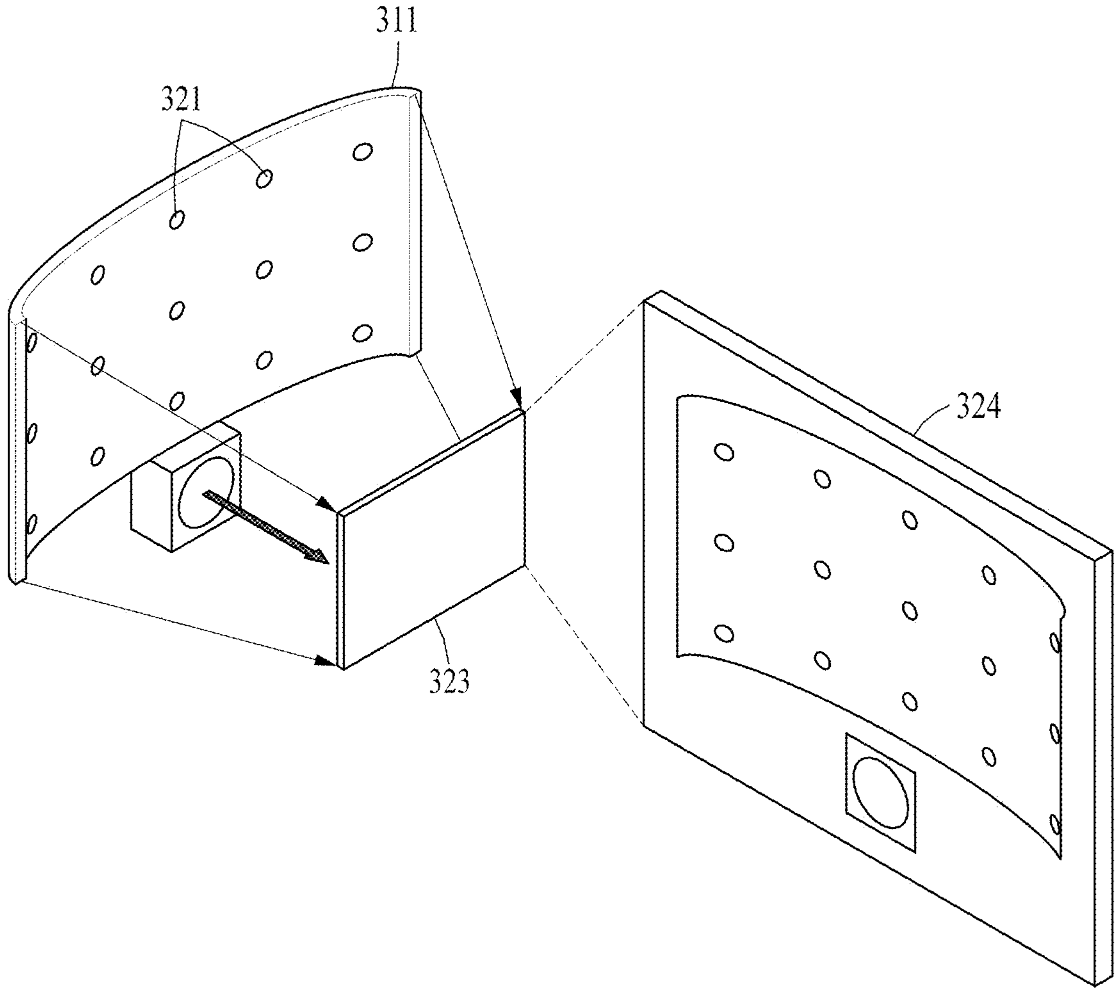
Figure 3C:
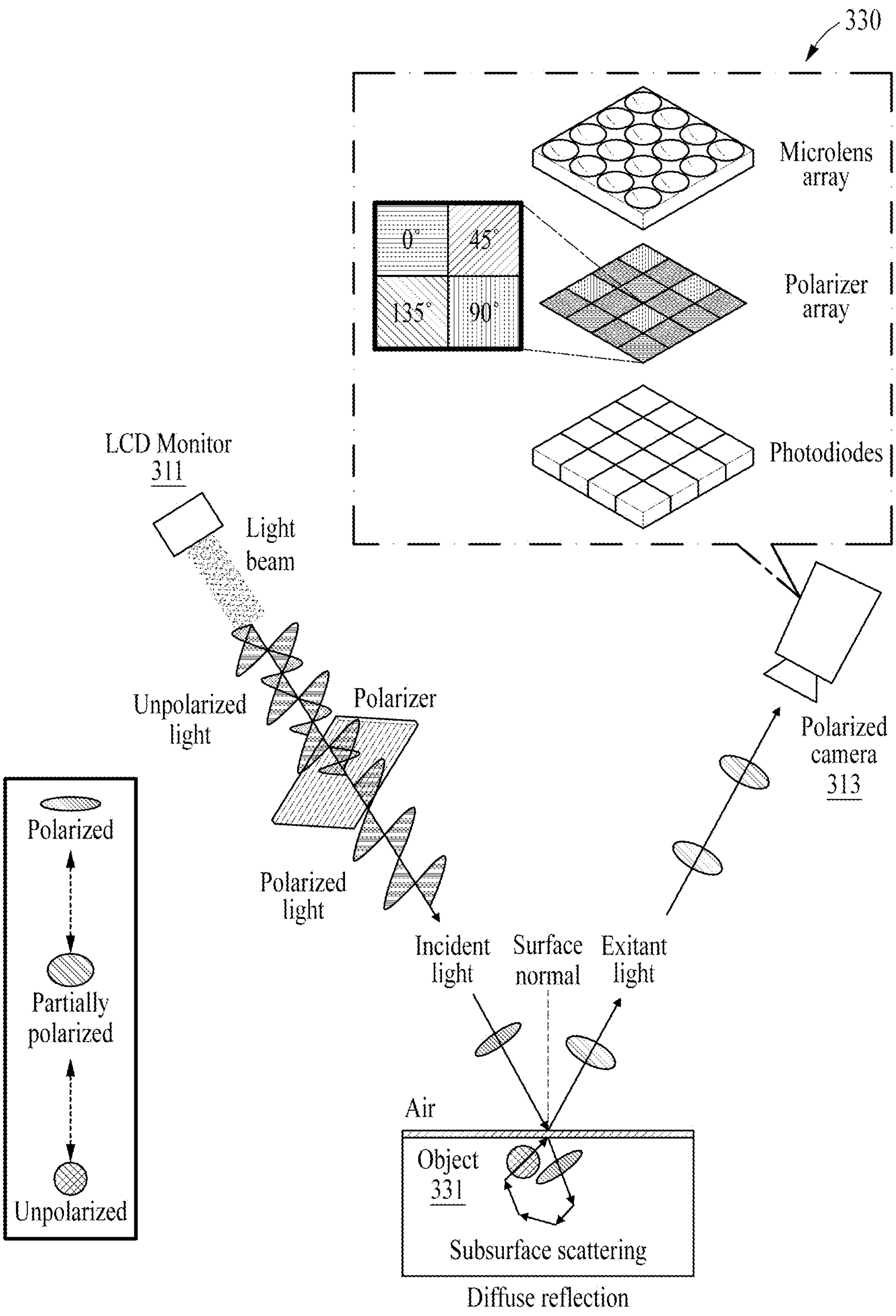
Figure 3D:
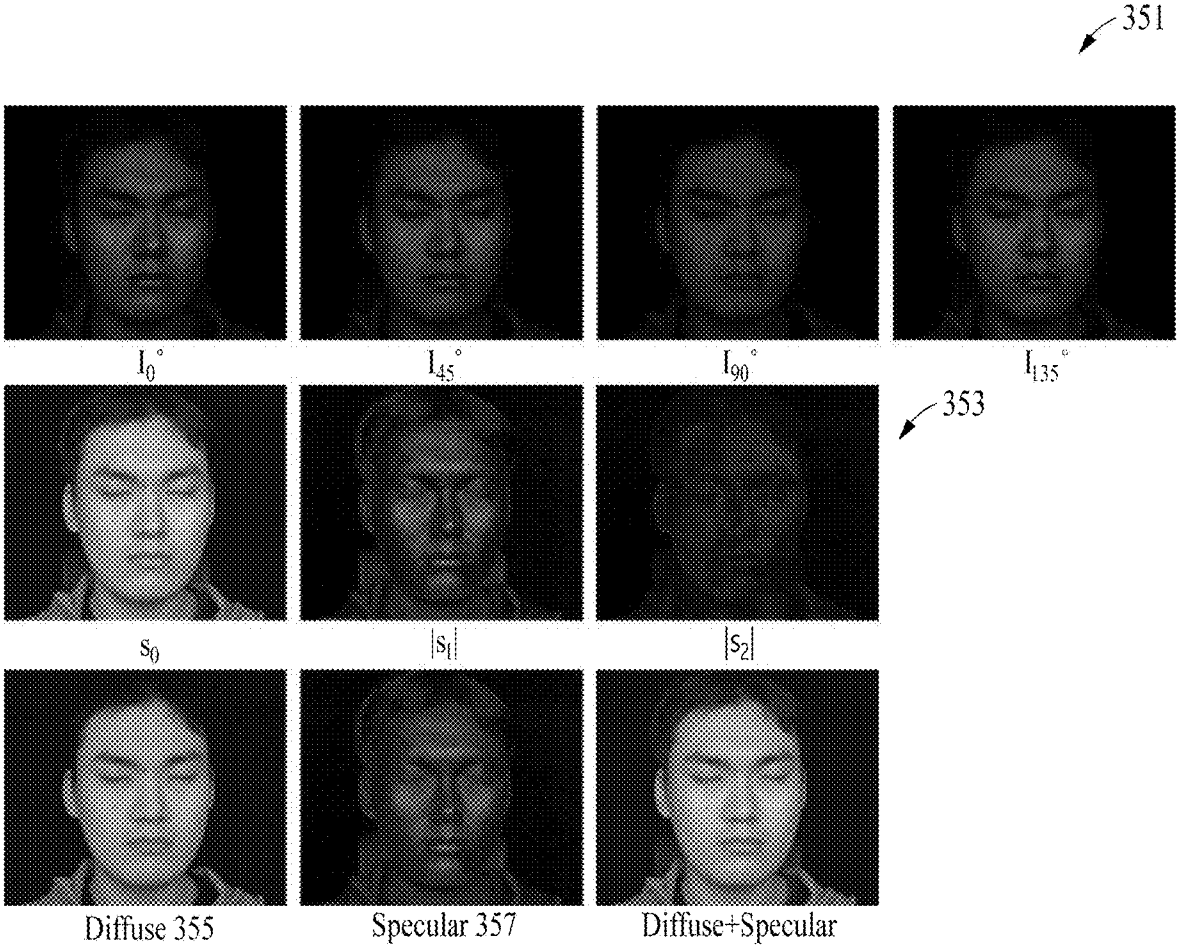

FIGS. 3A to 3D are diagrams each illustrating mirror-based calibration and image preprocessing, according to an example embodiment. Referring to FIGS. 3A and 3B, an imaging system 310 for calibration based on a mirror 323 according to an example embodiment and diagram 320 illustrating a geometric calibration process based on the mirror 323 according to an example embodiment are provided. FIG. 3C is diagram 330 illustrating a process of separating a specular reflection component by using a polarization feature according to an example embodiment. FIG. 3D is diagram 350 illustrating a process of obtaining an image from which a specular reflection component is removed by using a polarized image according to an example embodiment.

The imaging system 310 may include a display 311 and a camera 313.

The display 311 may be a commercial, large, curved LCD monitor, but examples are not limited thereto. Each pixel of the display 311 may release horizontal linear polarization in a trichromatic RGB spectrum. A pixel of the display 311 may be a super pixel, which is M=9×16, but examples are not limited thereto.

The camera 313 may be a polarization camera as illustrated in FIG. 3C. The camera 313 may be, for example, a polarization camera having an On-sensor linear polarization filter.

The camera 313 may capture, for example, images $I_0$°, $I_{45}$°, $I_{90°}$ and $I_{135°}$ 351 respectively obtained by capturing four linear polarization intensities at four different angles (e.g., 0°, 45°, 90°, and 135°) as illustrated in the diagram 350 of FIG. 3D. In this case, linear polarization released from the display 311 may interact with an actual scene and may generate both a specular reflection component and a diffuse reflection component with respect to a surface point. The specular reflection component may maintain a polarization state of light while the diffuse reflection component may not be polarized from time to time.

In an example embodiment, respective spectrum distributions of the camera 313 and the display 311 are assumed to match each other. According to example embodiments, a spectrum block filter may be additionally used in front of the camera 313.

In addition, in an example embodiment, a plane geometry of a vertex of a target scene is assumed (e.g., the assumption that the respective spectrum distributions of the camera 313 and the display 311 match each other). Thus, biased estimation may be performed on a scene where a depth change is stark. In an example embodiment, a multi-view camera may be used for depth estimation and may mitigate the biased estimation on the scene where a depth change is stark.

Referring to the diagram 320 of FIG. 3A and FIG. 3B, the geometric calibration process based on the mirror 323 is illustrated. In an example embodiment, a calibration method based on the mirror 323 may be used to estimate a unique parameter of the camera 313 and each pixel location of the display 311 with respect to the camera 313.

The pattern determination device may display white pixel lattice points 321 on the display 311 and may locate the mirror (e.g., a plane mirror) 323 at a certain pose (e.g., a certain angle) in front of the camera 313. The pattern determination device may capture an image 324 of the mirror 323 reflecting some lattice points of a grid pattern 321 to which pixel coordinates of the display 311 are assigned.

More specifically, the pattern determination device may calibrate a 3D location of the mirror 323 by using a checkerboard. The pattern determination device may capture an image reflected on the display 311. The pattern determination device may estimate 3D coordinates of a pixel of the display 311 by using the white pixel lattice points 321 displayed on the mirror 323. The pattern determination device may fit a curved plane to a calibrated vertex and may sample a pixel of the display 311 from the fitted plane. The pattern determination device may repeat such a process by variously changing a pose (e.g., an angle) of the mirror 323 and may generate multiple pairs of a checkerboard image 325 and a mirror image 326, which reflect the white pixel lattice points 321. The pattern determination device may estimate a unique parameter of the camera 313 and a 3D pose of each checkerboard from the checkerboard image 325. The pattern determination device may detect a 3D vertex of a lattice point displayed on each mirror image 326 in a known size of the display 311 and may obtain a 3D vertex of a pixel of the display 311 through calibration. The pattern determination device may obtain pixel location information of the display 311 on a camera coordinate system through mirror-based calibration.

In this case, the pattern determination device may remove a specular reflection component from an image captured by using a polarization feature and may obtain a diffuse reflection image as illustrated in the diagram 330 of FIG. 3C. The pattern determination device may optically separate a specular reflection component and a diffuse reflection component from a first image obtained by capturing a 3D object 331 by using the camera 313. The pattern determination device may analyze a polarization state of incident radiant intensity through the camera 313 and may separate a specular reflection component and a diffuse reflection component according to an acquisition speed. The pattern determination device may resolve a diffuse reflection image and a specular reflection image by using linear polarization released from the display (e.g., an LCD monitor) 311. The pattern determination device may obtain, as an image corresponding to a 3D object, an image of a diffuse reflection component obtained by removing a specular reflection component from the image (the first image) obtained by capturing the 3D object. The pattern determination device may effectively reconstruct a surface normal by applying a photometric stereo technique only to an image (e.g., an image 315 or 357) where diffuse reflection components are dominant.

The pattern determination device may obtain an image (the first image) captured by using the display 311 configured to emit polarized light and the camera 313 configured to capture various pieces of linear polarization information in real time and remove a specular reflection component from the obtained image, thereby effectively reconstructing a surface normal. The pattern determination device may calculate actual 3D coordinates of each pixel of the display 311 through mirror-based calibration.

In an example embodiment, the instability of reconstructing a normal caused by a specular reflection component may be mitigated when a surface normal is reconstructed by using an image including both a diffuse reflection component and a specular reflection component by reconstructing a surface normal from an image (or referred to as a diffuse reflection image) where diffusion is dominant. To reconstruct a normal, as illustrated in FIG. 3D, the pattern determination device may convert four polarization intensity values, that is, raw images $I_0$°, $I_{45}$°, $I_{90°}$ and $I_{135°}$ 351 captured at four different angles (e.g., 0°, 45°, 90°, and 135°), into linear Stokes vector elements $s_0$, $s_1$, and $s_2$ as shown in Equation 1.

$$s_0 = \frac{I_{0°} + I_{45°} + I_{90°} + I_{135°}}{2},\ s_1 = I_{0°} - I_{90°},\ s_2 = 2I_{45°} - I_{0°}, \quad \text{Equation 1}$$

Referring to diagram 353 of FIG. 3D, images converted into linear Stokes vector elements $s_0$, $s_1$, and $s_2$ are provided.

The pattern determination device may calculate a diffuse reflection component I and a specular reflection component S as shown in Equation 2.

$$S = \sqrt{s_1^2 + s_2^2},\ I = s_0 - S. \quad \text{Equation 2}$$

Images 315 and 355 may be images of the diffuse reflection component I and images 317 and 357 may be images of the specular reflection component S. The pattern determination device may apply the images 315 and 355, which may be images of the diffuse reflection component I, to the photometric stereo technique.

As described above, the pattern determination device may perform diffuse-reflection separation by using a polarization illumination of the display 311 and the imaging system 310.

The pattern determination device may estimate a location of lattice points displayed on a display device by using a mirror. The pattern determination device may obtain the first image by adjusting a location of the display device such that the location of the display device is in the location of the lattice points and removing a specular reflection element from the obtained first image.

Figure 4A:
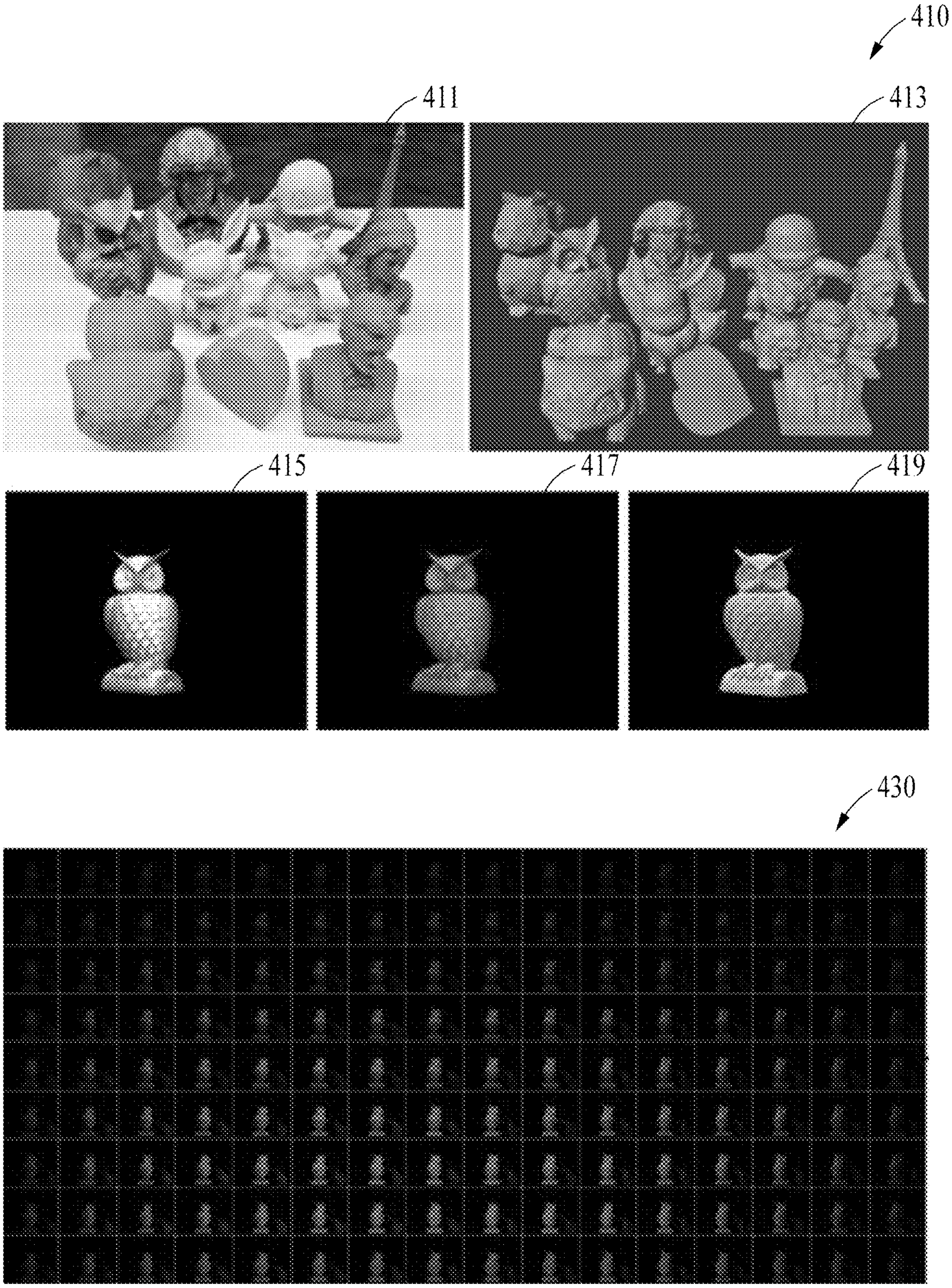
FIGS. 4A and 4B are diagrams each illustrating a method of constructing a dataset, according to an example embodiment.
Figure 4B:
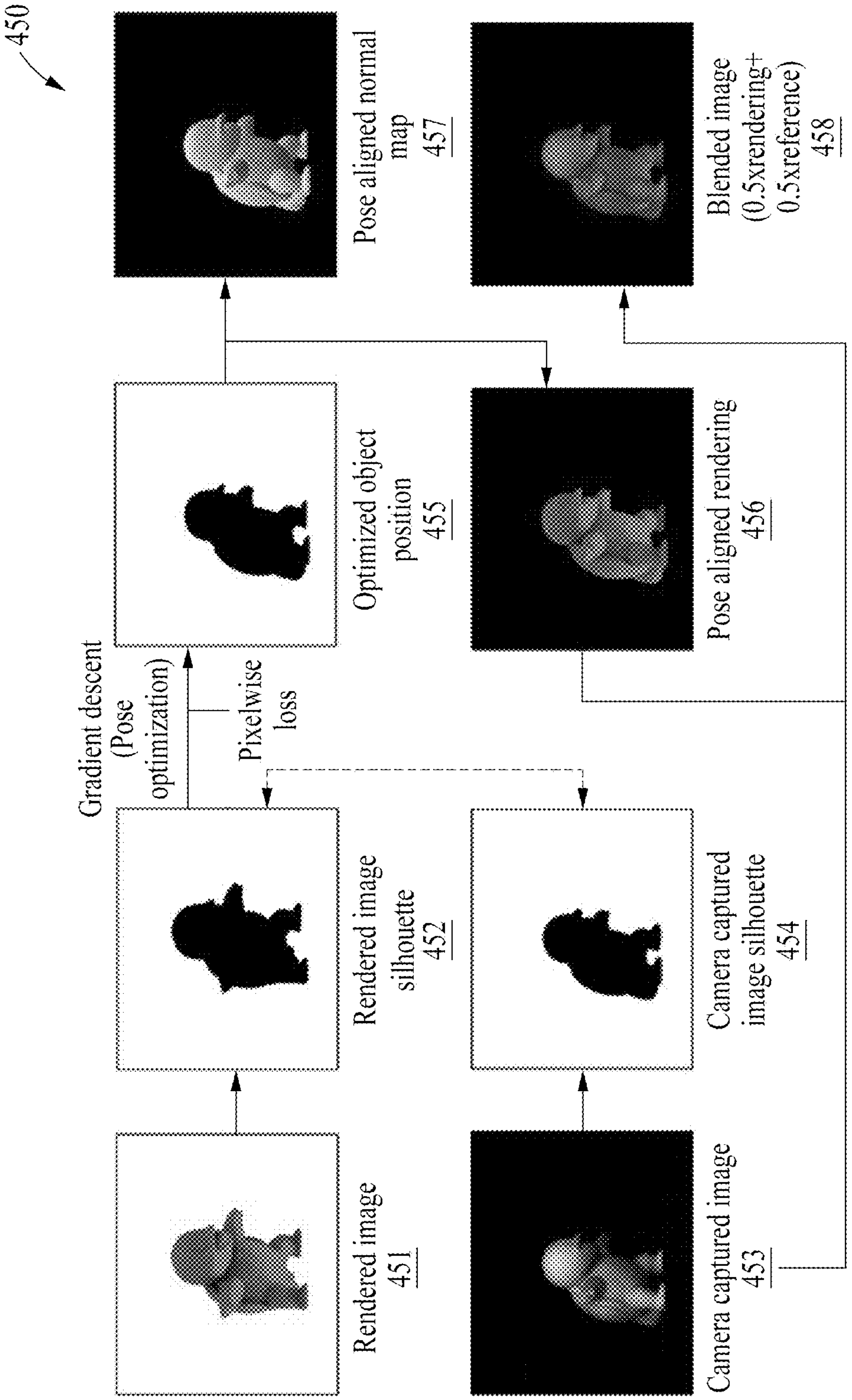

FIGS. 4A and 4B are diagrams each illustrating a method of constructing a dataset, according to an example embodiment.

Referring to FIG. 4A, diagram 410 illustrates a 3D-printed object 411, a ground-truth image 413 corresponding to a result of rendering the 3D-printed object 411, an average image 415 overlayed by a ground-truth silhouette S, an actually measured (ground-truth) 3D model 417 along a silhouette fitted to the average image 415, and a ground-truth normal map 419 obtained from a fitted 3D. FIG. 4A also illustrates basis images 430 of a 3D-printed object.

Referring to FIG. 4B, diagram 450 illustrates a process of estimating a ground-truth surface normal vector (a first surface normal vector) of an object through differentiable rendering based on an image captured in a process of obtaining a dataset, according to an example embodiment.

In an example embodiment, the dataset may be generated through 3D printing by using a known, actually measured shape. The pattern determination device may, for example, print eleven different 3D models in 3D by using a fused deposition modeling (FDM)-based 3D printer having 0.2-millimeter (mm) print resolution. The pattern determination device may provide various appearances in terms of a color, scattering, or a diffuse/reflection ratio by using various filaments (e.g., polylactic acid (PLA), PLA+, Matte PLA, eSilk-PLA, eMarble-PLA, Gradient Matte PLA, or polyethylene terephthalate glycol (PETG)).

The pattern determination device may construct the dataset by estimating a first surface normal vector of a 3D object from a first image obtained by capturing the 3D object of which surface normal information is already known, such as the 3D-printed object 411.

To construct a training scene, the pattern determination device may locate a part of a 3D-printed object in front of an imaging system. The pattern determination device may capture the basis images $$\mathcal{B} = \{B_j\}_{j=1}^{M}$$

430 for each scene. Here, j may be an index of a basis illumination in which a jth super pixel is turned on at a maximum intensity in a white color.

The pattern determination device may optimize a movement parameter of the 3D object and a rotation parameter of the 3D object in a virtual environment and may align a second image rendered through a differentiable rendering technique with the first image such that the second image becomes the same as the first image. The pattern determination device may estimate the first surface normal vector based on the aligned first and second images.

More specifically, the pattern determination device may overlay a ground-truth silhouette 454 on an average image 453 of the basis images 430. The pattern determination device may extract a silhouette mask S by using the average image $I_{avg}$ 453 of the basis images 430 represented as light images with respect to most points of an object scene, like the average image 453 overlaid with the ground-truth silhouette 454.

When the silhouette mask S is provided, the pattern determination device may align a ground-truth geometry of a 3D-printed object in a scene. The pattern determination device may align a pose for the estimation of the first surface normal vector.

The pattern determination device may minimize a silhouette rendering loss compared to the silhouette mask S and may optimize a pose of a ground-truth mesh of an object in a scene. The pattern determination device may optimize a pose of an actually measured mesh of the object by using a gradient descent method. In this case, the silhouette rendering loss may correspond to a difference between the ground-truth silhouette 454 of the average image 453 of the basis images 430 captured by a camera and a rendered silhouette image 452 obtained from a rendering image 451.

In this case, the silhouette rendering loss may be calculated as a mean squared error between the silhouette mask S and the rendered silhouette image 452. The mean squared error may be backpropagated to optimize a location t of the object and a rotation r of the object. The pattern determination device may optimize the movement parameter and the rotation parameter of the object in a virtual environment such that a captured image (e.g., the average image 453 of the basis images 430 captured by the camera) becomes the same as the rendering image 451 through differentiable rendering.

The optimization process described above may be, for example, expressed by Equation 3.

$$\underset{t,r}{\text{minimize}} \| f_s(\pi; t, r) - S \|_2^2, \qquad \text{Equation 3}$$

Here, τ denotes a 3D model of a 3D-printed object in a scene. fs(•) denotes a differentiable silhouette rendering function. The pattern determination device may use a calibration parameter of the camera in a virtual camera setting during rendering. The pattern determination device may solve Equation 3 by using the gradient descent method.

When pose parameters for 3D models are obtained, the pattern determination device may render a normal map 457, in which poses are aligned, by using 3D models 455 having optimized poses. In this case, the rendered normal map 457 may be used as a ground-truth normal map $N_{GT}$ for end-to-end optimization. The pattern determination device may generate a pose-aligned rendering image 456 by using the rendered normal map 457. The pattern determination device may generate a blending image 458 by blending the pose-aligned rendering image 456 with the average image 453 of the basis images 430 at a one-to-one ratio. The blending image 458 may be used to visually determine the alignment accuracy of a ground-truth normal map.

Figure 5A:
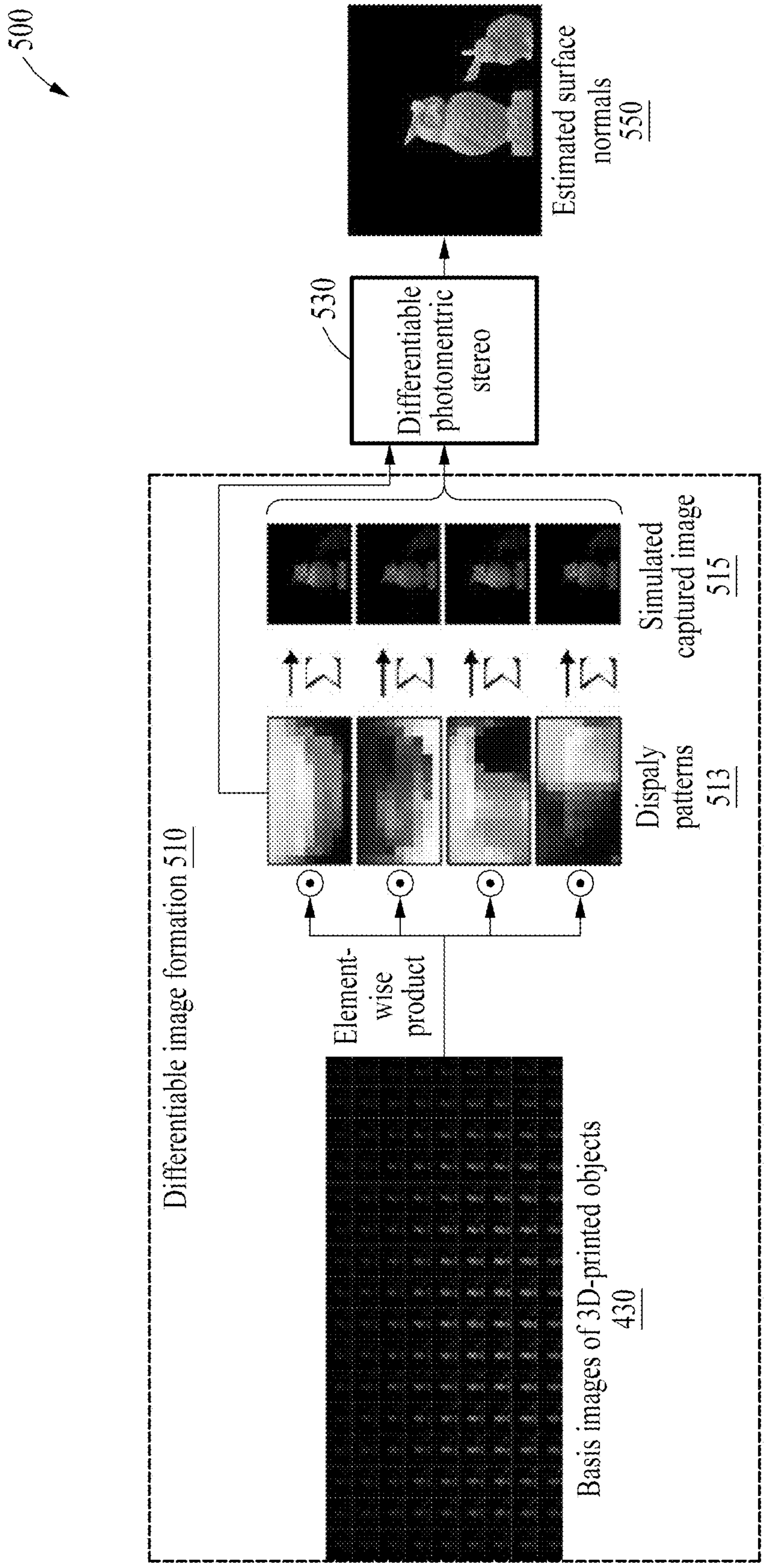
FIGS. 5A and 5B are diagrams illustrating a method of reconstructing a photometric stereo technique, according to an example embodiment.
Figure 5B:
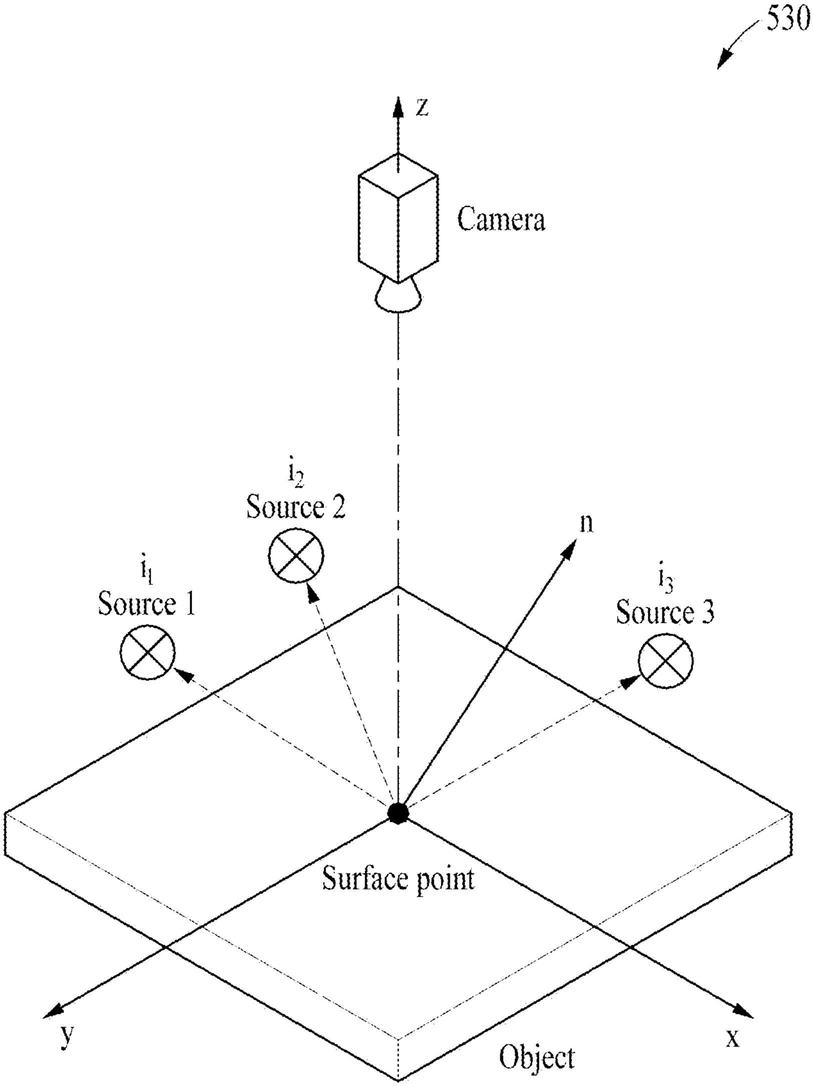

FIGS. 5A and 5B are diagrams illustrating a method of reconstructing a photometric stereo technique, according to an example embodiment. Referring to FIG. 5A, diagram 500 illustrates a differentiable image formation process 510 and a photometric stereo framework 530, according to an example embodiment. FIG. 5B illustrates the photometric stereo framework 530 in more detail.

A pattern determination device may combine the basis images 430 of FIG. 4 of an acquired dataset and may generate new simulation images 515 for virtual illumination patterns 513. The pattern determination device may generate the virtual illumination patterns 513, for example, by using an elementwise product operation for the basis images 430. The pattern determination device, for example, as shown in Equation 8 below, may replace an image formation formula approximated to a linear system with the virtual illumination patterns 513 and the simulation images 515 corresponding to virtual illumination patterns 513 and may estimate a surface normal vector 550 for an object by using the photometric stereo framework 530. In an example embodiment, the photometric stereo framework 530 may be a DDPS framework, but example embodiments are not limited thereto.

The photometric stereo framework 530 may reconstruct a surface normal for each pixel by using a change of an illumination condition. The pattern determination device may calculate a difference between the estimated surface normal vector 550 and a ground-truth normal vector, may backpropagate the calculated difference, and may optimize the virtual illumination patterns 513.

The pattern determination device may apply a penalty directly to a reconstruction loss of the surface normal through the photometric stereo framework 530, that is, a differentiable framework based on the photometric stereo technique. The photometric stereo framework 530 may be used as an active illumination module for generating a trichromatic intensity change of changing a display spatially.

By using the differentiable framework that combines the differentiable image formation process 510 of forming differentiable basis images with photometric stereo reconstruction, the pattern determination device may promote illumination pattern training, which leads to high-quality surface normal reconstruction.

More specifically, to learn illumination patterns that are used in the reconstruction of a surface normal, the pattern determination device may use a training dataset of a pair of an actually measured normal map $N_{GT}$ and the basis images 430 of FIG. 4.

For example, K different virtual illumination patterns 513 may be expressed by $$\mathcal{M} = \{\mathcal{M}_i\}_{i=1}^{K}.$$

In this case, an ith illumination pattern Mi may be modeled to an illumination pattern $M_i$ having an RGB intensity pattern of M super pixels $\mathcal{M}_i \in \mathbb{R}^{M\times 3}$, which are optimization variables.

The pattern determination device may reconstruct a surface normal by using a differentiable image formation function $f_I(\bullet)$ and a differentiable photometric stereo function fn(•), which are connected together through automatic differentiation for end-to-end training of an RGB intensity pattern $\mathcal{M}$.

In this case, the differentiable image formation function $f_I(\bullet)$ may simulate an image $I_i$ captured based on the illumination pattern Mi of a training scene and the basis images $\mathcal{B}$ 430. The pattern determination device may perform image simulation on K different virtual illumination patterns 513 and may obtain the simulated captured images $$\mathcal{I} = \{I_i\}_{i=1}^{K}. \quad 515$$

The pattern determination device may process the simulated captured images $\mathcal{I}$ 515 by using the photometric stereo function fn(•) and may estimate a surface normal N. The pattern determination device may estimate the surface normal N, for example, through N=ρn. Here, ρ denotes an albedo and n denotes a surface normal vector. In this case, the albedo ρ may be obtained through ρ=||N||. In addition, the surface normal vector n may be obtained through $$n = \frac{N}{\|N\|}.$$

The surface normal N may be obtained through $N=(I)^{-1}L$, and I may be obtained by multiplying a light source l by a light source direction i, like I=li. In addition, L denotes an output radiant (final color) and may be obtained through L=lN.

The pattern determination device may compare the estimated surface normal 550 with the actually measured normal NGT and may backpropagate a loss according to a comparison result at an intensity of the illumination pattern $\mathcal{M}$ through a differentiable flow.

The pattern determination device may optimize the illumination pattern $\mathcal{M}$, for example, as shown in Equation 4.

$$\underset{\mathcal{M}}{\text{minimize}} \sum_{\mathcal{B},N_{GT}} \text{loss}\left(f_n\left(\{f_I(\mathcal{M}_i,\mathcal{B})\}_{i=1}^{K}, \mathcal{M}\right), N_{GT}\right), \quad \text{Equation 4}$$

In this case, loss(•)=(1−N· $N_{GT}$)/2 may be an angular difference between the estimated surface normal 550 and an actual surface normal. In an example embodiment, for example, though an Adam optimizer program, Equation 4 may be solved by using a stochastic gradient descent method for a 3D-printed dataset.

The pattern determination device may simulate an image captured under the virtual illumination patterns $\mathcal{M}_i$ 513 with respect to the basis images $\mathcal{B}$ 430 of a training sample in a differentiable method and may generate simulated captured images $I_i$.

$$I_i = f_I(\mathcal{M}_i, \mathcal{B}) = \sum_{j=1}^{M} B_j \mathcal{M}_{i,j}, \quad \text{Equation 5}$$

In this case, $\mathcal{M}_{i,j}$ may be an RGB intensity of a jth super pixel of the illumination patterns $\mathcal{M}_i$. $B_j$ may be a jth basis image among the basis images $\mathcal{B}$ 430.

The pattern determination device may synthesize the simulated captured images $I_i$ respectively corresponding to all the K virtual illumination patterns 513 as shown in Equation 6.

$$\mathcal{I} = \{f_I(\mathcal{M}_i, \mathcal{B})\}_{i=1}^{K}. \quad \text{Equation 6}$$

A weighted sum formula used in the differentiable image formation process 510 may use basis images obtained for an actual 3D-printed object based on the light transmission linearity of a ray optics system. According to the differentiable image formation process 510, image formation using basis images may provide memory-efficient and effective image formation, which may synthesize a realistic image.

The pattern determination device may reconstruct the surface normal N from the simulated captured images $\mathcal{I}$ 515 that are captured under various illumination patterns $\mathcal{M}$ or captured through simulation as shown in Equation 7.

$$N = f_n(\mathcal{I}, \mathcal{M}). \quad \text{Equation 7}$$

Diffuse reflection components may be dominantly included in the simulated captured images $\mathcal{I}$ 515 due to the separation of diffuse reflection components and specular reflection components through polarization.

In an example embodiment, a trinocular photometric stereo technique that is independent of a training dataset and has no training parameters may be employed by using a diffuse reflection image I optically separated from a photometric stereo. The trinocular photometric stereo technique may be useful for an efficient gradient update for an illumination pattern during end-to-end training.

For example, a captured diffuse RGB intensity of a camera pixel p may be expressed by $$I_i^c.$$

Here, c denotes a color channel c∈{R,G, B} For simplicity, the dependency on a pixel may not be included in $$I_i^c.$$

In addition, an illumination vector from the center of the jth super pixel of the display may be expressed by $l_j$. The surface normal N may be calculated based on a reference plane assumption under which a scene point P corresponding to the camera pixel p is assumed to be on a plane that is 50 centimeters (cm) away from a camera.

The image formation formula approximated to a linear system may be expressed by Equation 8.

$$I = \rho \odot MlN, \quad \text{Equation 8}$$

Here, I denotes a captured image, and ρ denotes a primary color of an object, which is an albedo. N denotes a surface normal of the object. ⊙ denotes the Hadarmard product. M denotes a color (or color intensity) of a pattern. I denotes a matrix for an illumination direction, which is an incident vector of light.

The pattern determination device may set the albedo ρ to a maximum intensity between captured images, may solve the linear system by using a pseudo-inverse matrix by a pseudo-inverse method, and may estimate the surface normal N. When the surface normal N is estimated, the pattern determination device may rewrite Equation 8 to solve the albedo ρ again as shown in Equation 9.

$$I^c = \rho^c M^c l N, \quad \text{Equation 9}$$

Here, $I^c$ and $M^c$ may respectively correspond to an original vector I and a channel-specific version of a matrix M.

The pattern determination device may use the pseudo-inverse method for each channel c∈{R,G, B} and may estimate a channel-specific albedo $\rho^c$, as $\rho^c \leftarrow I^c(M^c l N)^{-1}$.

The pattern determination device may repeat normal estimation and albedo estimation to increase accuracy and repeated estimation may improve reconstruction quality.

The estimated surface normal 550 may be a result of reconstructing a surface normal and an albedo.

Figure 6:
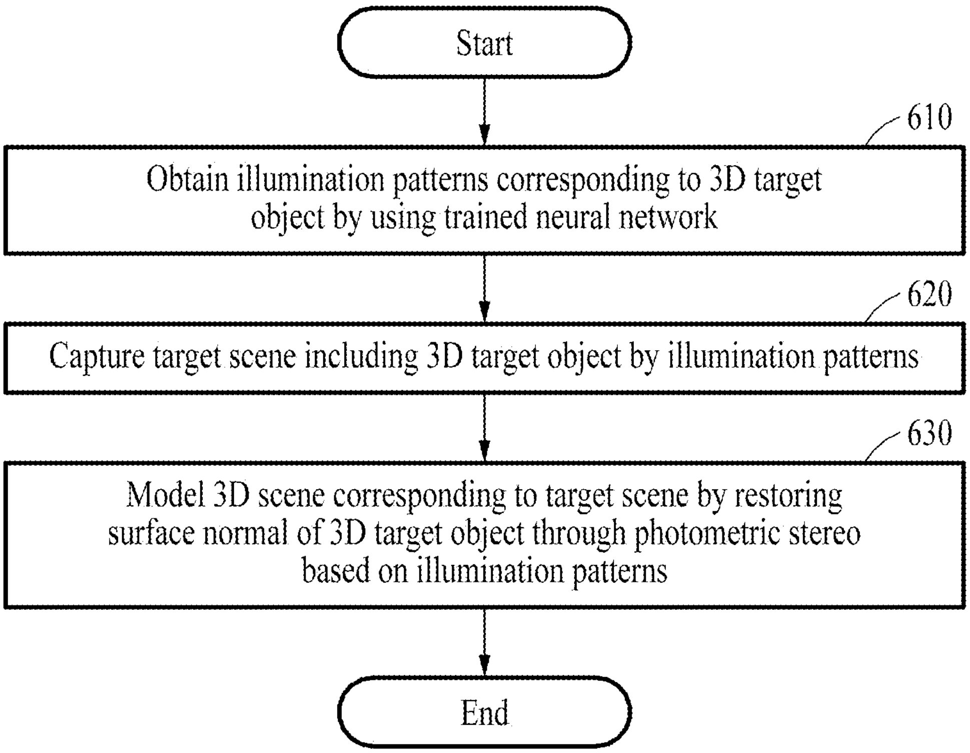
FIG. 6 is a flowchart illustrating a method of modeling a three-dimensional (3D) scene, according to an example embodiment.
Figure 7:
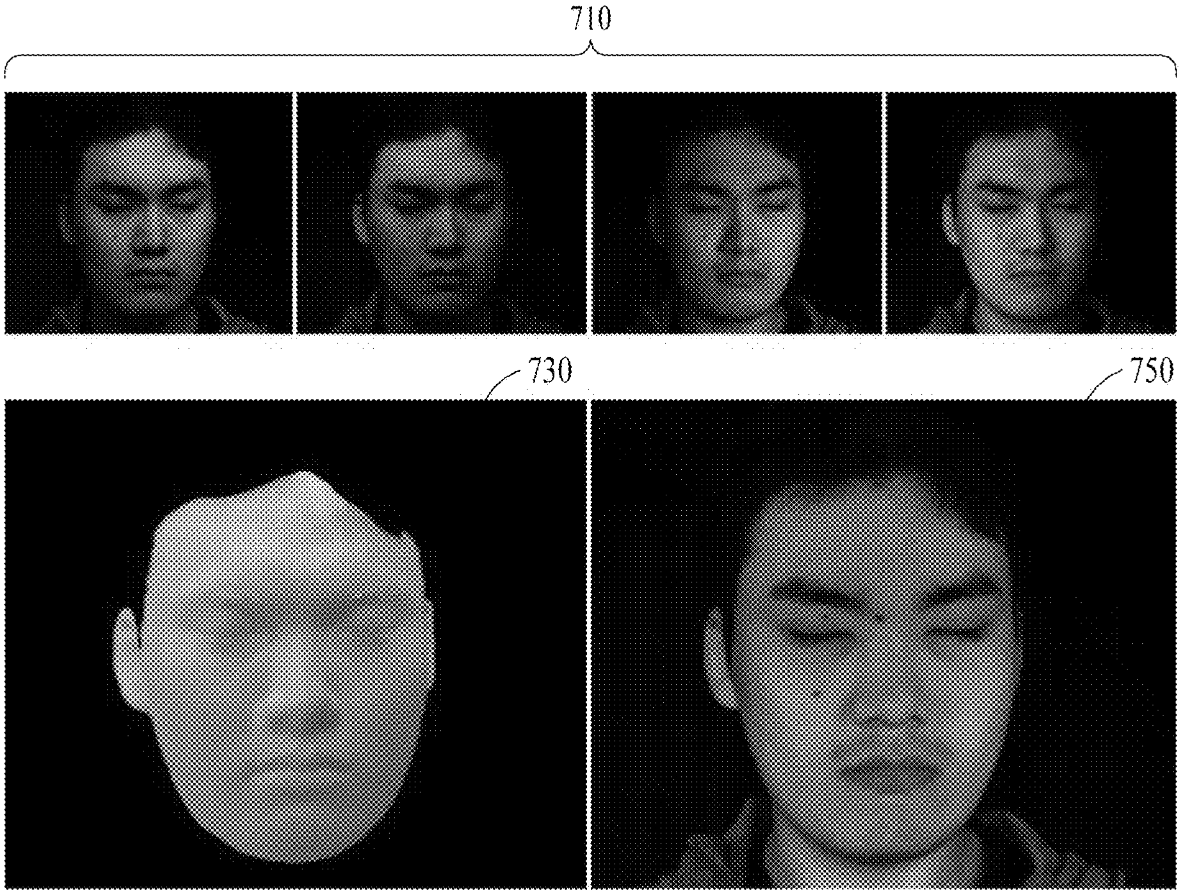
FIG. 7 is a diagram illustrating a surface normal vector of an object restored through a photometric stereo technique from a captured scene, according to an example embodiment.

FIG. 6 is a flowchart illustrating a method of modeling a three-dimensional (3D) scene, according to an example embodiment; and FIG. 7 is a diagram illustrating a surface normal vector of an object restored through a photometric stereo technique from a captured scene, according to an example embodiment.

Referring to FIGS. 6 and 7, an apparatus for modeling a 3D scene (hereinafter, the "modeling apparatus") may model a 3D scene corresponding to a target scene through operations 610 to 630.

In operation 610, the modeling apparatus may obtain illumination patterns corresponding to a 3D target object by using a trained neural network. In this case, the neural network may be trained by a dataset constructed by estimating a first surface normal vector of a 3D object from a first image obtained by capturing the 3D object of which surface normal information is already known. The illumination patterns obtained in operation 610 may be illumination patterns optimized through the operations described above.

In operation 620, the modeling apparatus may capture the target scene including the 3D target object by using the illumination patterns obtained in operation 610 as shown in diagram 710.

In operation 630, the modeling apparatus may model the 3D scene corresponding to the target scene by restoring a surface normal of the 3D target object through a photometric stereo technique based on the illumination patterns as shown in diagram 730.

The 3D scene corresponding to the target scene may include, for example, an estimated diffuse albedo, as shown in diagram 750.

The modeling apparatus may estimate a high-quality surface normal by capturing the target scene by using the illumination patterns obtained in operation 610. The modeling apparatus may estimate a surface normal N for an actual target scene by using the illumination patterns optimized through the operations described above.

The modeling apparatus may obtain a diffuse reflection image corresponding to one of the illumination patterns by performing a separation of a diffuse reflection component and a specular reflection component on each frame of the target scene.

The modeling apparatus may apply a photometric stereo function fn(•) according to the photometric stereo technique, to the diffuse reflection image of the target scene that corresponds to the optimized illumination pattern and may estimate the surface normal N of the 3D target object as shown in Equation 10.

$$N = f_n(\mathcal{I}). \quad \text{Equation 10}$$

The modeling apparatus may be at least one of a lighting stage, a handheld flash camera, an imaging system comprising a display camera system, a wearable device including a smart glass, a head-mounted device (HMD) including an augmented reality (AR) device, a virtual reality (VR) device, and a mixed reality (MR) device, and a user terminal comprising a television, a smartphone, a personal computer (PC), a tablet, and a laptop, but examples are not limited thereto.

Figure 8:
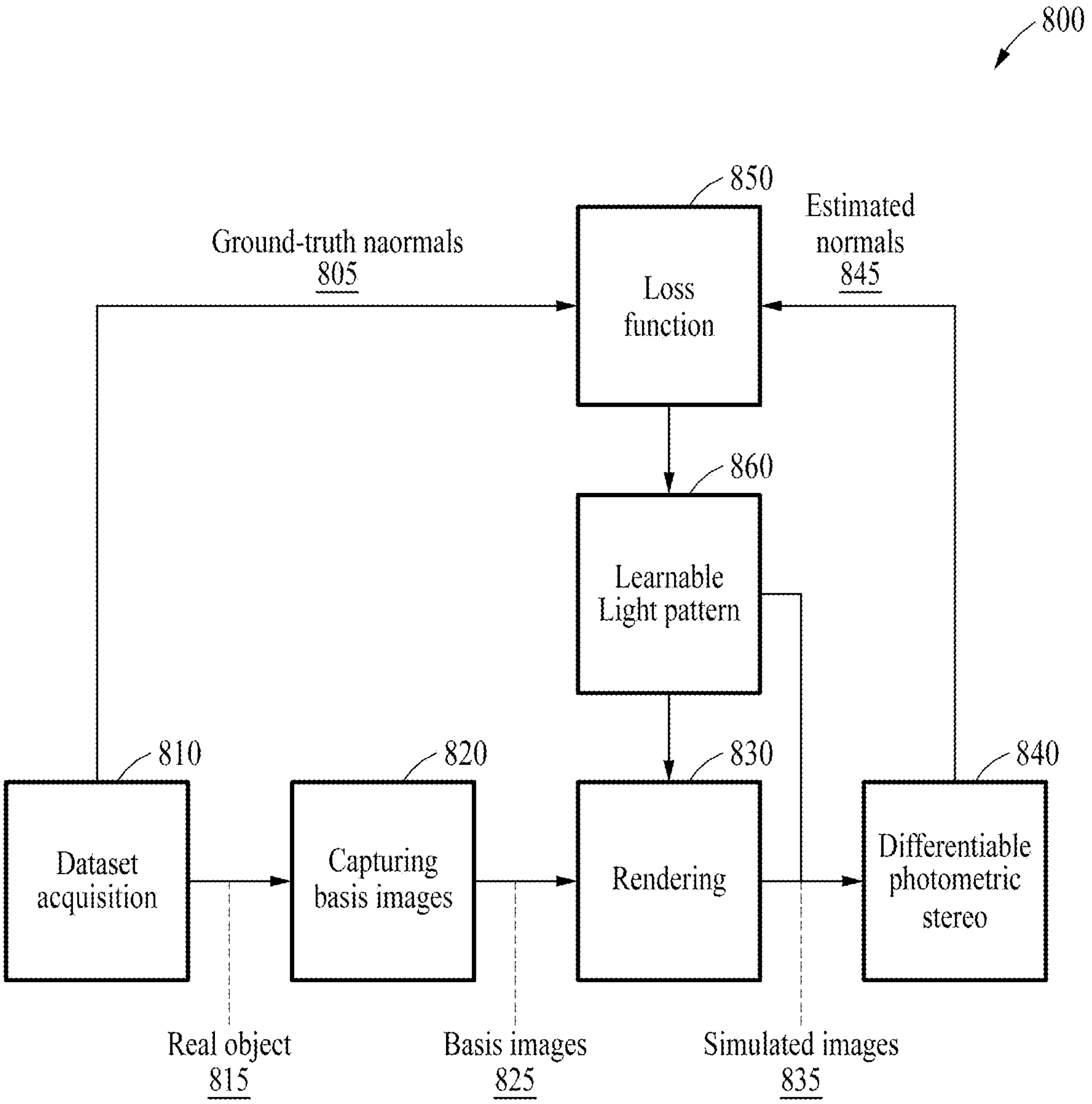
FIG. 8 is a diagram illustrating a training process for determining an illumination pattern, according to an example embodiment.

FIG. 8 is a diagram illustrating a training process for determining an illumination pattern, according to an example embodiment. Referring to FIG. 8, diagram 800 illustrates the training process for determining an illumination pattern.

In a dataset acquisition process 810, a pattern determination device may capture an actual object 815 by using a basis illumination and may obtain a ground-truth surface normal vector 805 of the actual object 815 through differentiable rendering based on a captured image.

The pattern determination device may generate basis images 825 based on the captured image of the actual object 815. The pattern determination device may obtain basis images 825 through a capturing process 820 (that is, by capturing the actual object 815).

The pattern determination device may perform rendering in a rendering process 830 on the basis images 825 and may obtain simulated images 835. In the rendering process 830, the pattern determination device may use an illumination pattern 860 trained by a loss function 850, which is based on a difference between the ground-truth surface normal vector 805 and a surface normal vector 845 estimated through reconstruction according to a differentiable photometric stereo technique.

The pattern determination device may input the simulated images 835 and the trained illumination pattern 860 to a differentiable photometric stereo framework 840 and may estimate the surface normal vector 845 through the reconstruction according to the differentiable photometric stereo technique. The differentiable photometric stereo framework 840 may correspond to the differentiable photometric stereo framework 530 described above.

Figure 9:
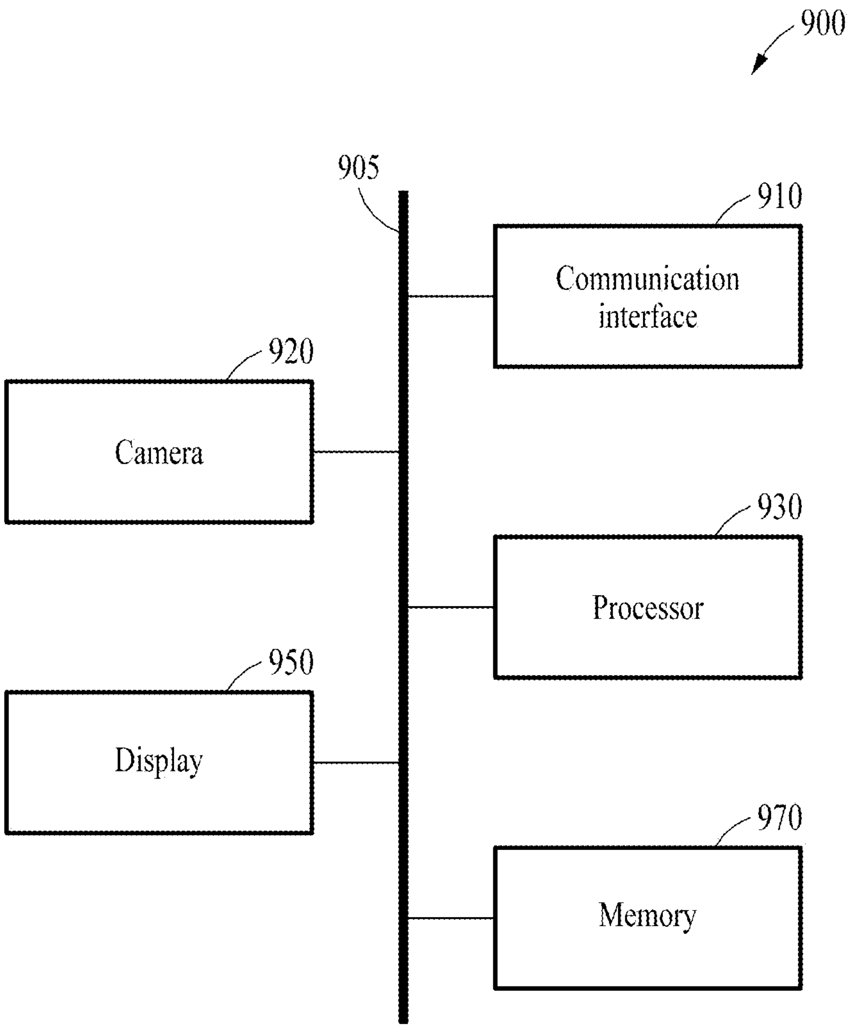
FIG. 9 is a block diagram illustrating an apparatus for modeling a 3D scene, according to an example embodiment.

FIG. 9 is a block diagram illustrating an apparatus for modeling a 3D scene, according to an example embodiment. Referring to FIG. 9, a modeling apparatus 900 may include a communication interface 910, a camera 920, a processor 930, a display 950, and a memory 970. The communication interface 910, the camera 920, the processor 930, the display 950, and the memory 970 may be connected to one another through a communication bus 905.

The communication interface 910 may receive illumination patterns corresponding to a 3D target object. In this case, the illumination patterns may be output by a neural network trained through the above-described process.

The camera 920 may capture a target scene including the 3D target object by using the illumination patterns received through the communication interface 910. In this case, the camera 920 may include, for example, a polarization camera or a stereo camera, and may capture a stereo image, but examples are not limited thereto. In the modeling apparatus 900 implemented as a smartphone, the camera 920 may include multi-camera sensors each having a different optical specification. Smartphone cameras may have a fixed baseline, but the size and/or resolution of an image captured by each camera 920 may vary.

The processor 930 may model the 3D scene corresponding to the target scene captured by the camera 920 by restoring a surface normal of the 3D target object through a photometric stereo technique based on the illumination patterns received through the communication interface 910.

The display 950 may display at least one of the illumination patterns received through the communication interface 910 and the 3D scene modeled by the processor 930.

The memory 970 may store the illumination patterns received through the communication interface 910, a surface normal vector of the 3D target object restored by the processor 930, and/or the 3D scene modeled by the processor 930.

In addition, the memory 970 may store various pieces of information generated during the processing of the processor 930. In addition, the memory 970 may store various pieces of data, programs, and/or the like. The memory 970 may include a volatile memory and/or a non-volatile memory. The memory 970 may include a massive storage medium, such as a hard disk, and may store various pieces of data.

In addition, the processor 930 may perform the method(s) described with reference to FIGS. 1 to 7 and an algorithm corresponding to the methods. The processor 930 may execute a program and may control the modeling apparatus 900. The code of the program to be executed by the processor 930 may be stored in the memory 970.

The examples described herein may be implemented by using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and/or generate data in response to execution of the software. For purpose of simplicity, the description of a processing unit is used as singular; however, one skilled in the art would understand that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or any combination thereof, to independently or collectively instruct or configure the processing unit to operate as desired. Software and data may be stored in any type of machine, component, physical or virtual equipment, or computer storage medium or device capable of providing instructions or data to or being interpreted by the processing unit. The software also may be distributed over network-coupled computer systems so that the software is stored and executed in a distributed fashion. The software and data may be stored by one or more non-transitory computer-readable recording mediums.

The method(s) according to the above-described example embodiments may be recorded in a non-transitory computer-readable medium including program instructions to implement various operations of the above-described examples. The medium may, alone or in combination, program instructions, data files, data structures, and the like. The program instructions recorded on the medium may be those specially designed and constructed for the purposes of examples, or they may be of the kind known and available to those having skill in the computer software arts. Examples of a non-transitory computer-readable medium include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random-access memory (RAM), flash memory, and the like. Examples of program instructions may include machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of determining an illumination pattern, the method comprising:
- constructing a dataset by estimating a first surface normal vector of a three-dimensional (3D) object from a first image obtained by capturing the 3D object of which surface normal information is known, the dataset comprising basis images of the 3D object;
- generating simulation images in which virtual illumination patterns, obtained based on a combination of the basis images, are applied to the 3D object;
- estimating a second surface normal vector of the 3D object, by reconstructing a surface normal using a photometric stereo technique based on the virtual illumination patterns and simulation images corresponding to the virtual illumination patterns; and
- training a neural network to determine an illumination pattern based on a difference between the first surface normal vector and the second surface normal vector.

2. The method of claim 1, wherein the constructing the dataset comprises:
- obtaining the first image by capturing the 3D object under a basis illumination; and
- estimating the first surface normal vector from the first image by using a differentiable rendering technique.

3. The method of claim 2, wherein the obtaining the first image comprises performing preprocessing of removing a specular reflection component from the first image.

4. The method of claim 3, wherein the performing the preprocessing comprises:
- predicting a location of lattice points, displayed on a display device, by using a mirror; and
- removing the specular reflection component from the first image by adjusting a location of the display device to be in the location of the lattice points.

5. The method of claim 4, wherein the first image is obtained by capturing the 3D object by using a polarization camera, and
- wherein the obtaining the first image by removing the specular reflection component comprises:
- optically distinguishing the specular reflection component and a diffuse reflection component from the first image; and
- removing the specular reflection component from the first image and obtaining, as the first image, an image of the diffuse reflection component.

6. The method of claim 2, wherein the estimating the first surface normal vector comprises:
- aligning the first image and a second image, which is rendered by using the differentiable rendering technique, to be the same by optimizing a movement parameter and a rotation parameter of the 3D object in a virtual environment; and
- estimating the first surface normal vector based on the aligned first image and second image.

7. The method of claim 1, wherein the generating the simulation images comprises:
- corresponding to the basis images, synthesizing the simulation images obtained by simulating, in a differentiable method, images captured by using the virtual illumination patterns.

8. The method of claim 7, wherein the synthesizing the simulation images comprises:
- synthesizing the simulation images by applying, for each of the virtual illumination patterns, a weighted sum in which a red, green, and blue (RGB) color intensity corresponding to at least a part of each of the basis images is multiplied by a corresponding virtual illumination pattern.

9. The method of claim 1, wherein the estimating the second surface normal vector comprises reconstructing a surface normal of the 3D object by using a display and a camera.

10. The method of claim 1, wherein the estimating the second surface normal vector comprises:
- reconstructing at least one of a surface normal or a diffuse albedo from the simulation images corresponding to the virtual illumination patterns.

11. The method of claim 10, wherein the reconstructing the at least one of the surface normal or the diffuse albedo comprises:
- setting the diffuse albedo to a maximum intensity between the simulation images;
- estimating the surface normal by using a pseudo-inverse method based on the diffuse albedo set to the maximum intensity;
- estimating the diffuse albedo by using the pseudo-inverse method for each RGB channel of the simulation images; and
- reconstructing the surface normal and the diffuse albedo by repeating estimation on the surface normal and the diffuse albedo.

12. The method of claim 1, wherein the estimating the second surface normal vector comprises:
- predicting the second surface normal vector by replacing a linear system based on the photometric stereo technique with virtual illumination patterns and the simulation images corresponding to the virtual illumination patterns.

13. A non-transitory computer-readable storage medium storing instructions that, when executed by a processor, cause the processor to perform the method of claim 1.

14. A method of modeling a three-dimensional (3D) scene, the method comprising:
- obtaining illumination patterns, corresponding to a 3D target object, by using a trained neural network;
- capturing a target scene comprising the 3D target object by using the illumination patterns; and
- modeling a 3D scene corresponding to the target scene by restoring, based on the illumination patterns, a surface normal of the 3D target object using a photometric stereo technique, wherein the obtaining of the illumination patterns comprises:

constructing a dataset by estimating a first surface normal vector of the 3D target object from a first image obtained by capturing the 3D target object of which surface normal information is known, the dataset comprising basis images of the 3D target object;

generating simulation images in which virtual illumination patterns, obtained based on a combination of the basis images, are applied to the 3D target object:

estimating a second surface normal vector of the 3D target object, by reconstructing a surface normal using a photometric stereo technique based on the virtual illumination patterns and simulation images corresponding to the virtual illumination patterns; and training the neural network to determine the illumination patterns based on a difference between the first surface normal vector and the second surface normal vector.

15. The method of claim 14, wherein the modeling the 3D scene comprises:

obtaining a diffuse reflection image corresponding to one of the illumination patterns by separating a diffuse reflection component and a specular reflection component in each frame of the target scene; and estimating a surface normal vector of the 3D target object by applying the photometric stereo technique to the diffuse reflection image.

16. The method of claim 14, wherein the neural network is trained by a dataset constructed by estimating a first surface normal vector of a 3D object from a first image, the first image being obtained by capturing the 3D object of which surface normal information is known.

17. An apparatus for modeling a three-dimensional (3D) scene, the apparatus comprising:

a communication interface configured to receive illumination patterns corresponding to a 3D target object;

a camera configured to capture a target scene comprising the 3D target object by using the illumination patterns; and a processor configured to model a 3D scene corresponding to the target scene by restoring, based on the illumination patterns, a surface normal of the 3D target object using a photometric stereo technique, wherein the received illumination patterns are determined by:

constructing a dataset by estimating a first surface normal vector of the 3D target object from a first image obtained by capturing the 3D target object of which surface normal information is known, the dataset comprising basis images of the 3D target object;

generating simulation images in which virtual illumination patterns, obtained based on a combination of the basis images, are applied to the 3D target object;

estimating a second surface normal vector of the 3D target object, by reconstructing a surface normal using a photometric stereo technique based on the virtual illumination patterns and simulation images corresponding to the virtual illumination patterns; and training a neural network to determine the illumination patterns based on a difference between the first surface normal vector and the second surface normal vector.

18. The apparatus of claim 17, wherein the processor is further configured to:

obtain a diffuse reflection image corresponding to one of the illumination patterns by separating a diffuse reflection component and a specular reflection component in each frame of the target scene; and estimate a surface normal vector of the 3D target object by applying the photometric stereo technique to the diffuse reflection image.

19. The apparatus of claim 17, further comprising a display configured to display at least one of the illumination patterns or the modeled 3D scene.

20. The apparatus of claim 17, further comprising at least one of a lighting stage, a handheld flash camera, an imaging system comprising a display camera system, a wearable device comprising a smart glass, a head-mounted device (HMD) comprising at least one of an augmented reality (AR) device, a virtual reality (VR) device, or a mixed reality (MR) device; or a user terminal comprising at least one of a television, a smartphone, a personal computer (PC), a tablet, or a laptop.

* * * * *